(12) United States Patent
Chen et al.

(10) Patent No.: US 11,947,208 B2
(45) Date of Patent: Apr. 2, 2024

(54) DISPLAY PANEL AND DISPLAY DEVICE

(71) Applicant: HANNSTAR DISPLAY CORPORATION, Taipei (TW)

(72) Inventors: Jing-Xuan Chen, Tainan (TW); Cheng-Yen Yeh, Taichung (TW); Mu-Kai Kang, Tainan (TW); Sz-Kai Huang, Taichung (TW); Ming-Chang Yu, Taichung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 17/887,539

(22) Filed: Aug. 15, 2022

(65) Prior Publication Data
US 2023/0071568 A1    Mar. 9, 2023

(30) Foreign Application Priority Data
Sep. 8, 2021 (CN) .......................... 202111049872.3

(51) Int. Cl.
*G02F 1/1333* (2006.01)
*G02F 1/13357* (2006.01)
*G06F 3/041* (2006.01)
*G06F 3/044* (2006.01)

(52) U.S. Cl.
CPC .... *G02F 1/13338* (2013.01); *G02F 1/133603* (2013.01); *G06F 3/0412* (2013.01); *G06F 3/0446* (2019.05); *G06F 2203/04111* (2013.01)

(58) Field of Classification Search
CPC .... G06F 3/0412; G06F 3/0446; G06F 3/0443; G06F 2203/04111; G02F 1/13338; G02F 1/133603
See application file for complete search history.

(56) References Cited

U.S. PATENT DOCUMENTS

2017/0329443 A1* 11/2017 Wang ................. H10K 59/1213
2021/0408103 A1* 12/2021 Dai ....................... H01L 27/156

* cited by examiner

*Primary Examiner* — Deeprose Subedi
(74) *Attorney, Agent, or Firm* — Winston Hsu

(57) ABSTRACT

This invention discloses a display panel including a first substrate, light emitting elements, a touch sensing structure and a conductive layer. The light emitting elements are disposed on the first substrate. The touch sensing structure is disposed on the first substrate and on a side away from a light emitting surface of the light emitting elements. The conductive layer is disposed between the light emitting elements and the first substrate and includes contacts or at least a portion of the touch sensing structure, and the light emitting elements and the contacts are electrically connected.

21 Claims, 13 Drawing Sheets

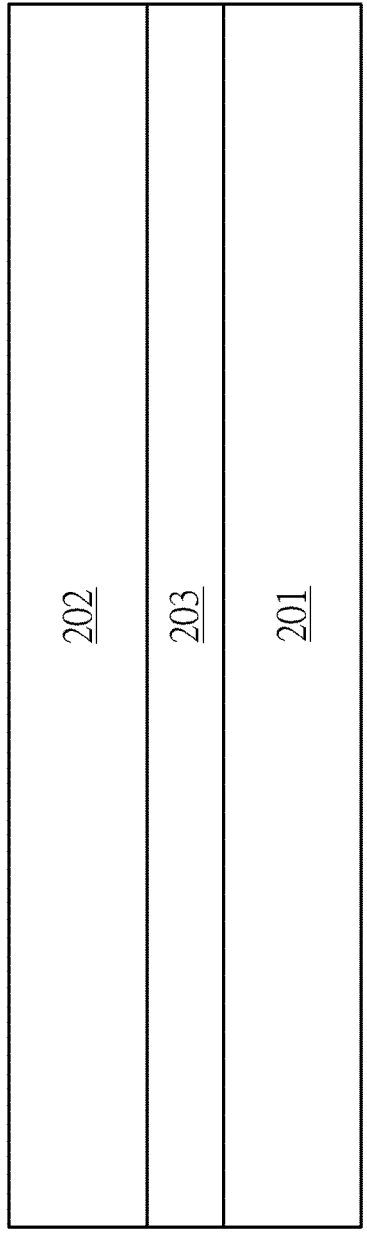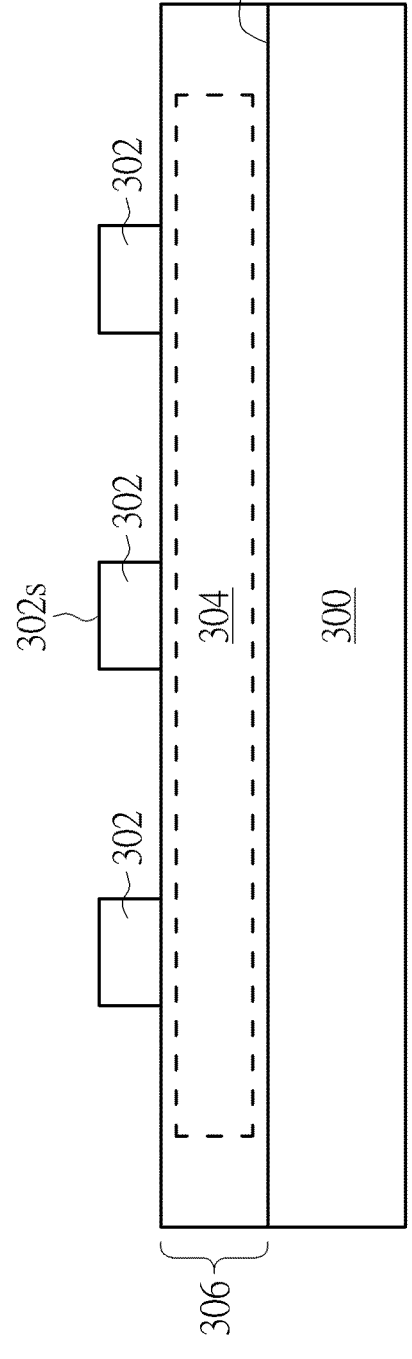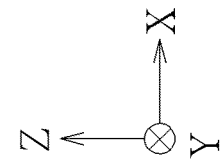
FIG. 13

DISPLAY PANEL AND DISPLAY DEVICE

BACKGROUND OF THE INVENTION

1. Field of the Invention

The present invention relates to a display panel and a display device, and more particularly, to a touch display panel and a touch display device.

2. Description of the Prior Art

In various types of electronic products, the display screen has been widely used with touch components to form touch display devices, users can directly communicate with electronic products instead of using traditional input devices such as a keyboard and a mouse, thereby reducing the volume of electronic products and improving the convenience of human-machine communication. In out-cell touch display devices, the touch component is attached to the display panel, which cannot effectively reduce the thickness or weight of the product. Therefore, developing an in-cell touch display device with touch components disposed in the display panel to reduce the thickness or weight of the product has become one of the important research topics in this field.

SUMMARY OF THE INVENTION

The technical problem to be solved by the present invention is reducing the thickness or weight of a touch display panel or a touch display device. Moreover, the manufacturing process of the touch sensing structure can be integrated into part of the manufacturing process of light emitting elements (such as the substrate having mini or micro LEDs), thereby saving the time and cost in the manufacturing process.

To solve the above technical problem, the present invention provides a display panel including a first substrate, a plurality of light emitting elements, a touch sensing structure and a conductive layer. The light emitting elements are disposed on the first substrate. The touch sensing structure is disposed on the first substrate, and the touch sensing structure is disposed on a side of the light emitting elements away from a light emitting surface of the light emitting elements. The conductive layer is disposed between the light emitting elements and the first substrate, the conductive layer includes at least a portion of the touch sensing structure, a plurality of first contacts or a plurality of second contacts, and the light emitting elements are electrically connected to the first contacts and the second contacts.

To solve the above technical problem, the present invention provides a display device including a display panel and a backlight module. The backlight module is disposed on a side of the display panel, and the backlight module includes a substrate, a plurality of light emitting elements, a touch sensing structure and a conductive layer. The light emitting elements are disposed on the substrate. The touch sensing structure is disposed on the substrate, and the touch sensing structure is disposed on a side of the light emitting elements away from a light emitting surface of the light emitting elements. The conductive layer is disposed between the light emitting elements and the substrate, the conductive layer includes at least a portion of the touch sensing structure, a plurality of first contacts or a plurality of second contacts, and the light emitting elements are electrically connected to the first contacts and the second contacts.

In the display panel and the display device of the present invention, the conductive layer having the electrode conducting lines used for driving the light emitting elements can also be used to form the touch sensing structure, thereby reducing the thickness or weight of the product.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 is a schematic diagram illustrating a display device of a seventh embodiment of the present invention.

DETAILED DESCRIPTION

Figure 1:
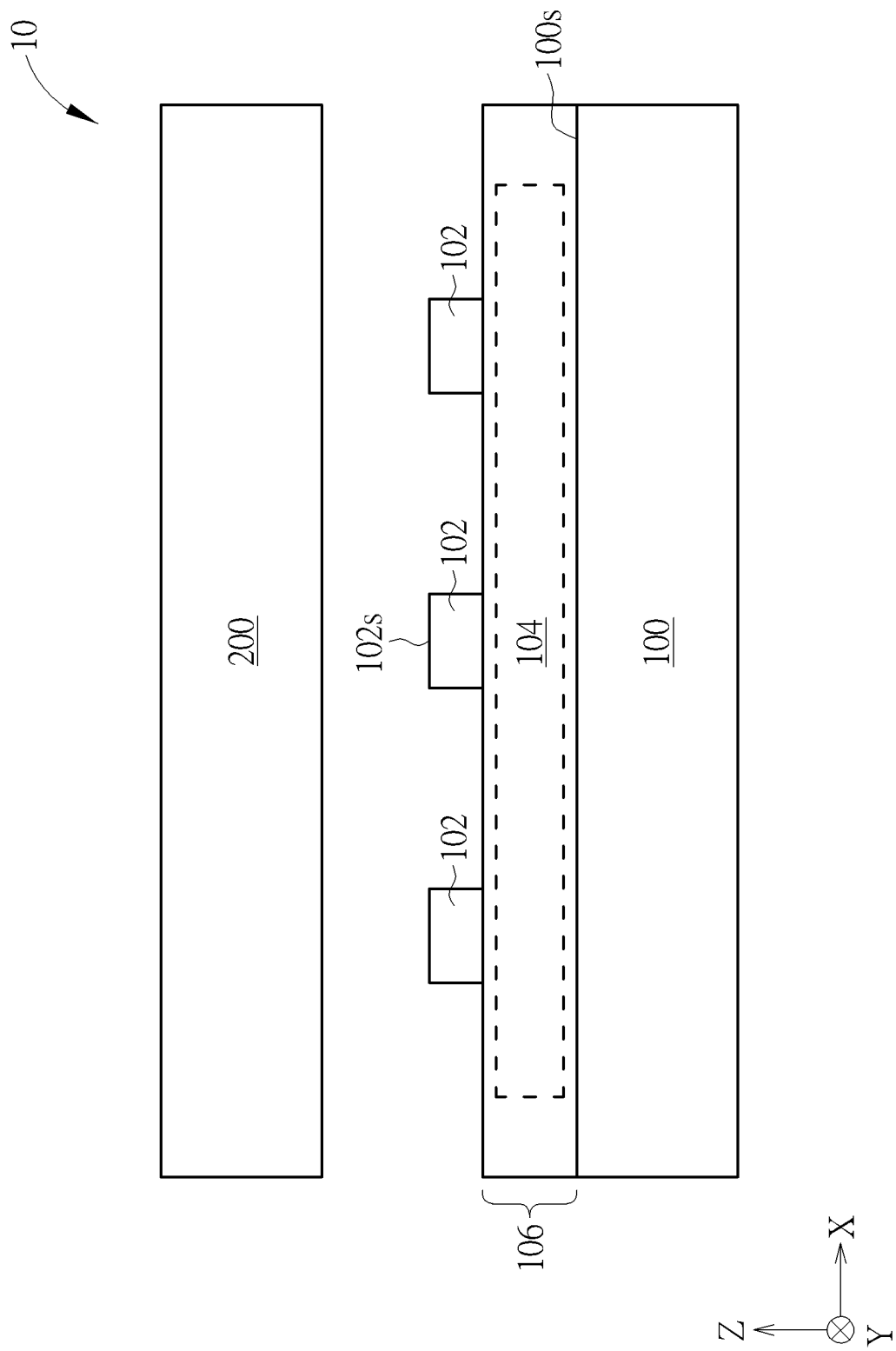
FIG. 1 is a schematic diagram illustrating a display panel of a first embodiment of the present invention.

To provide a better understanding of the present invention to those skilled in this field, preferred embodiments will be detailed as follows. The preferred embodiments of the present invention are illustrated in the accompanying drawings to elaborate on the contents and effects to be achieved. It should be noted that the drawings are simplified schematics, and therefore show only the components and combinations associated with the present invention, so as to provide a clearer description of the basic architecture or method of implementation. The components would be complex in reality. In addition, for ease of explanation, the components shown in the drawings may not represent their actual number, shape, and dimensions; details can be adjusted according to design requirements.

A direction X, a direction Y and a direction Z are shown in the following drawings. The direction Z may be perpendicular to a surface 100s of a substrate 100 (shown in FIG. 1) or a surface 300s of a substrate 300 (shown in FIG. 13), and the direction X and the direction Y may be parallel to the surface 100s of the substrate 100 or the surface 300s of the substrate 300. The direction Z may be perpendicular to the direction X and the direction Y, and the direction X may be perpendicular to the direction Y. The spatial relationship of structures can be described according to the directions X, Y and Z in the following drawings.

Referring to FIG. 1, FIG. 1 is a schematic diagram illustrating a display panel of a first embodiment of the present invention. The display panel 10 of this embodiment may be a self-luminous display panel, but not limited thereto. The display panel 10 includes a substrate 100 (or referred to as a first substrate), a substrate 200 (or referred to as a second substrate), a plurality of light emitting elements 102 and a touch sensing structure 104. The substrate 200 is disposed opposite to the substrate 100 in the direction Z, and the light emitting elements 102 are disposed between the substrate 100 and the substrate 200, and the light emitting elements 102 are disposed on the substrate 100. The touch sensing structure 104 is disposed on the substrate 100, and the touch sensing structure 104 is disposed on a side of the light emitting elements 102 away from a light emitting surface 102s of the light emitting elements 102, or the touch sensing structure 104 is disposed between the substrate 100 and the light emitting elements 102.

The substrate 100 or the substrate 200 may be a rigid substrate such as a glass substrate, a plastic substrate, a quartz substrate or a sapphire substrate, or may be a flexible substrate including, for example, polyimide (PI) or polyethylene terephthalate (PET), but not limited thereto. The light emitting element 102 may include a mini-light-emitting diode (mini-LED), a micro-light-emitting diode (micro-LED) or other suitable types of light emitting diodes, but not limited thereto. The light emitting element 102 of this embodiment may be a mini-LED as an example, but not limited thereto. The touch sensing structure 104 may be a capacitive touch sensing structure, but not limited thereto.

The display panel 10 may include a multilayer structure 106 disposed between the substrate 100 and the light emitting elements 102. The multilayer structure 106 may include at least one conductive layer and at least one insulating layer, and the conductive layers and the insulating layers may be used to form the touch sensing structure 104, but not limited thereto. In addition, at least one conductive layer can be used to form a plurality of contacts, and the light emitting elements 102 can be electrically connected to the electrode conducting lines on the substrate 100 through the contacts. The touch sensing structure 104 will be described below.

Figure 2:
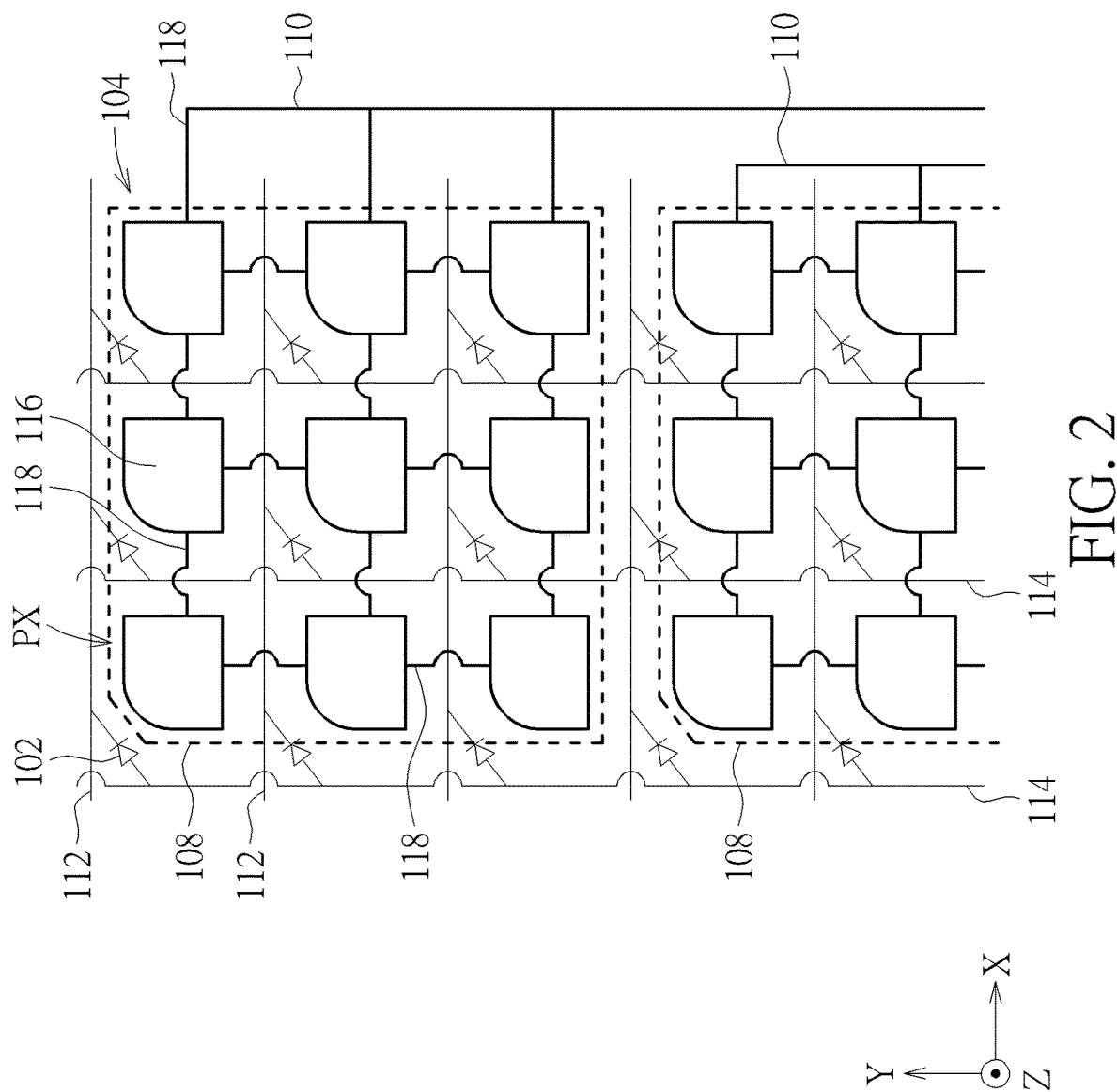
FIG. 2 is a schematic diagram illustrating a touch sensing structure and light emitting elements of the first embodiment of the present invention.

FIG. 2 is a schematic diagram illustrating a touch sensing structure and light emitting elements of the first embodiment of the present invention. The touch sensing structure 104 and the light emitting elements 102 in FIG. 2 may be disposed on the substrate 100, and the substrate 100 is omitted in FIG. 2. The touch sensing structure 104 of this embodiment may be a self-capacitance touch sensing structure, but not limited thereto. The touch sensing structure 104 may include a plurality of sensing pads 108, each of the sensing pads 108 may be electrically connected to one sensing line 110, and the sensing lines 110 may be disposed on the substrate 100.

The display panel 10 may include a plurality of electrode conducting lines 112 (or referred to as the first electrode conducting lines) and a plurality of electrode conducting lines 114 (or referred to as the second electrode conducting lines) disposed on the substrate 100. The electrode conducting lines 112 are extended in the direction X (or referred to as the first direction), the electrode conducting lines 114 are extended in the direction Y (or referred to as the second direction), a plurality of pixels PX can be defined by the electrode conducting lines 112 and the electrode conducting lines 114 crossing each other, and the pixels PX may be disposed in a matrix or checkerboard arrangement, but not limited to thereto.

One of the light emitting elements 102 is corresponded to one of the pixels PX. As shown in FIG. 2, one of the light emitting elements 102 can be disposed in one of the pixels PX, but not limited thereto. In addition, one of the light emitting elements 102 is electrically connected to one of the electrode conducting lines 112 and one of the electrode conducting lines 114. As shown in FIG. 2, each of the light emitting elements 102 can be electrically connected to one of the electrode conducting lines 112 and one of the electrode conducting lines 114, but not limited thereto.

Each of the sensing pads 108 of the touch sensing structure 104 can include a plurality of sensing electrodes 116 and a plurality of bridge lines 118. The sensing electrodes 116 can be electrically connected to each other through the bridge lines 118, and the sensing electrodes 116 can be electrically connected to the sensing lines 110 through the bridge lines 118. In addition, one of the sensing electrodes 116 is corresponded to one of the pixels PX. As shown in FIG. 2, each of the sensing electrodes 116 can be disposed in one of the pixels PX, but not limited thereto.

Figure 3:
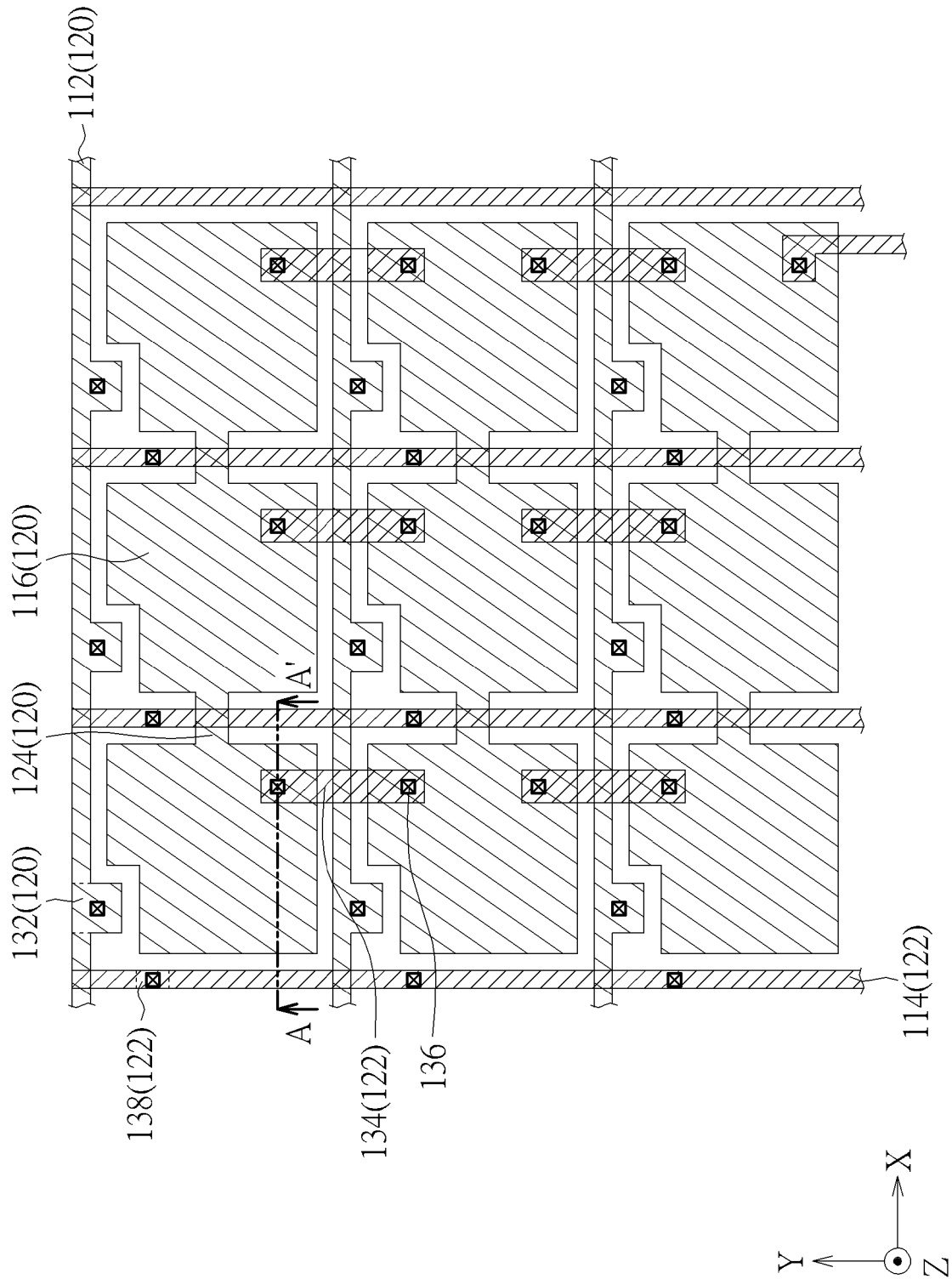
FIG. 3 is a schematic diagram illustrating a portion of a top view of the touch sensing structure of the first embodiment of the present invention.
Figure 4:
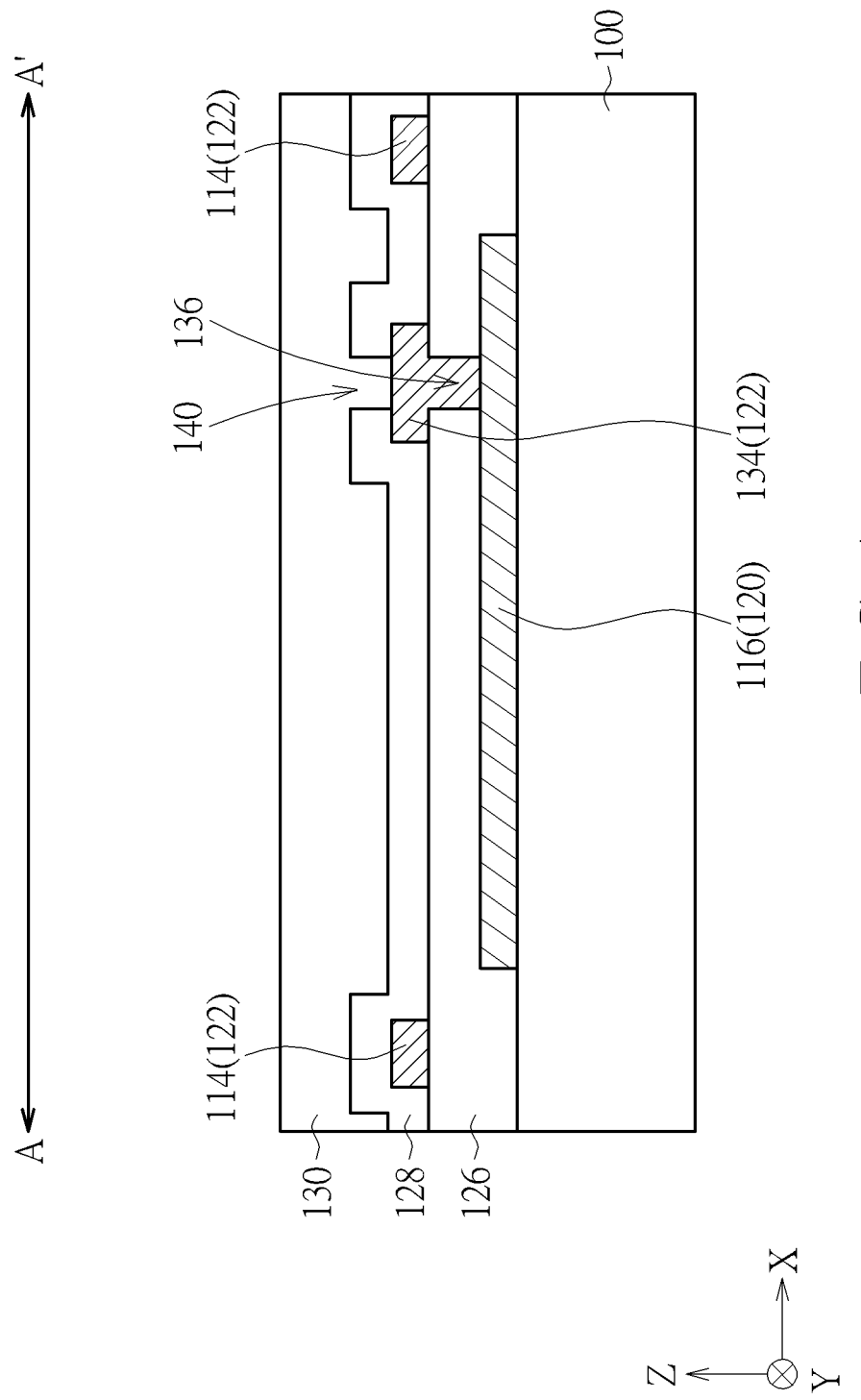
FIG. 4 is a schematic diagram illustrating a cross-sectional view along a line A-A' in FIG. 3.

Referring to FIG. 3 and FIG. 4, FIG. 3 is a schematic diagram illustrating a portion of a top view of the touch sensing structure of the first embodiment of the present invention, and FIG. 4 is a schematic diagram illustrating a cross-sectional view along a line A-A' in FIG. 3. The display panel 10 can include a conductive layer 120 (or referred to as the first conductive layer) and a conductive layer 122 (or referred to as the second conductive layer). The conductive layer 120 is disposed on the substrate 100, the conductive layer 122 is disposed on the conductive layer 120, and the light emitting elements 102 are disposed on the conductive layer 122. As shown in FIG. 4, the display panel 10 can include an insulating layer 126, an insulating layer 128 and an insulating layer 130. The insulating layer 126 is disposed between the conductive layer 120 and the conductive layer 122, the insulating layer 128 is disposed on the insulating layer 126, and the insulating layer 130 is disposed on the insulating layer 128.

The conductive layer 120 includes the electrode conducting lines 112, the sensing electrodes 116 and a plurality of bridge lines 124 (or referred to as the first bridge lines). Since the touch sensing structure 104 can include the sensing electrodes 116 and the bridge lines 124, the conductive layer 120 can include at least a portion of the touch sensing structure 104. The bridge lines 124 are extended in the direction X, and two adjacent sensing electrodes 116 in the direction X can be electrically connected to each other through one of the bridge lines 124. Since the sensing electrodes 116 and the bridge lines 124 are both formed by the conductive layer 120, the bridge lines 124 and the sensing electrodes 116 of this embodiment can be directly connected, but not limited thereto.

In addition, the conductive layer 120 includes a plurality of contacts 132 (or referred to as the first contacts), and each of the contacts 132 is electrically connected to one of the light emitting elements 102 and one of the electrode conducting lines 112. In this embodiment, the contacts 132 can be directly connected to the electrode conducting lines 112, but not limited thereto. In addition, an electrode of the light emitting element 102 can be electrically connected to the contact 132 through a contact hole for example, but not limited thereto.

The conductive layer 122 includes the electrode conducting lines 114 and a plurality of bridge lines 134 (or referred to as the second bridge lines). Since the touch sensing structure 104 can include the bridge lines 134, the conductive layer 122 can include at least a portion of the touch sensing structure 104. The bridge lines 134 are extended in the direction Y, and two adjacent sensing electrodes 116 in the direction Y can be electrically connected to each other through one of the bridge lines 134.

As shown in FIG. 3 and FIG. 4, the insulating layer 126 may include a plurality of contact holes 136, each of the contact holes 136 may be corresponded to one of the sensing electrodes 116 and expose a portion of the top surface of the sensing electrode 116. Furthermore, two ends of the bridge line 134 can be filled into the contact holes 136 in the insulating layer 126 and contacted with two portions of the top surface of the sensing electrode 116, and two adjacent sensing electrodes 116 can be electrically connected to each other through one bridge line 134. As shown in FIG. 4, the insulating layer 128 may include a plurality of contact holes 140, and each of the contact holes 140 may expose a portion of the top surface of one of the bridge lines 134, but not limited thereto.

In addition, as shown in FIG. 3, the conductive layer 122 includes a plurality of contacts 138 (or referred to as the second contacts), and each of the contacts 138 is electrically connected to one of the light emitting elements 102 and one of the electrode conducting lines 114. In this embodiment, the contacts 138 can be directly connected to the electrode conducting lines 114, but not limited thereto. In addition, another electrode of the light emitting element 102 can be electrically connected to the contact 138 through a contact hole for example, but not limited thereto.

The conductive layer 120 and the conductive layer 122 may include metal or other suitable conductive materials. For example, the conductive layer 120 and the conductive layer 122 of this embodiment may include a single metal layer or a composite metal layer, but not limited thereto. The single metal layer may include aluminum, copper, titanium, tungsten, etc., but not limited thereto. The composite metal layer may include molybdenum/aluminum/molybdenum, titanium/aluminum/titanium, titanium/copper/titanium, titanium/copper, etc., but not limited thereto. The insulating layers in the present invention may include inorganic insulating materials, organic insulating materials or other suitable insulating materials. For example, the insulating layers of this embodiment may include silicon oxide, silicon nitride or silicon oxynitride, but not limited thereto.

In this embodiment, the electrode conducting lines 112 and the electrode conducting lines 114 are used for driving the light emitting elements 102, the conductive layer 120 having the electrode conducting lines 112 and the conductive layer 122 having the electrode conducting lines 114 can be used to form the touch sensing structure 104, an in-cell touch display panel can therefore be obtained, and the thickness or weight of the product can be further reduced. Moreover, the manufacturing process of the touch sensing structure 104 can be integrated into part of the manufacturing process of the light emitting elements (such as the substrate having mini or micro LEDs), thereby saving the time and cost in the manufacturing process.

The display panel of the present invention is not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 5:
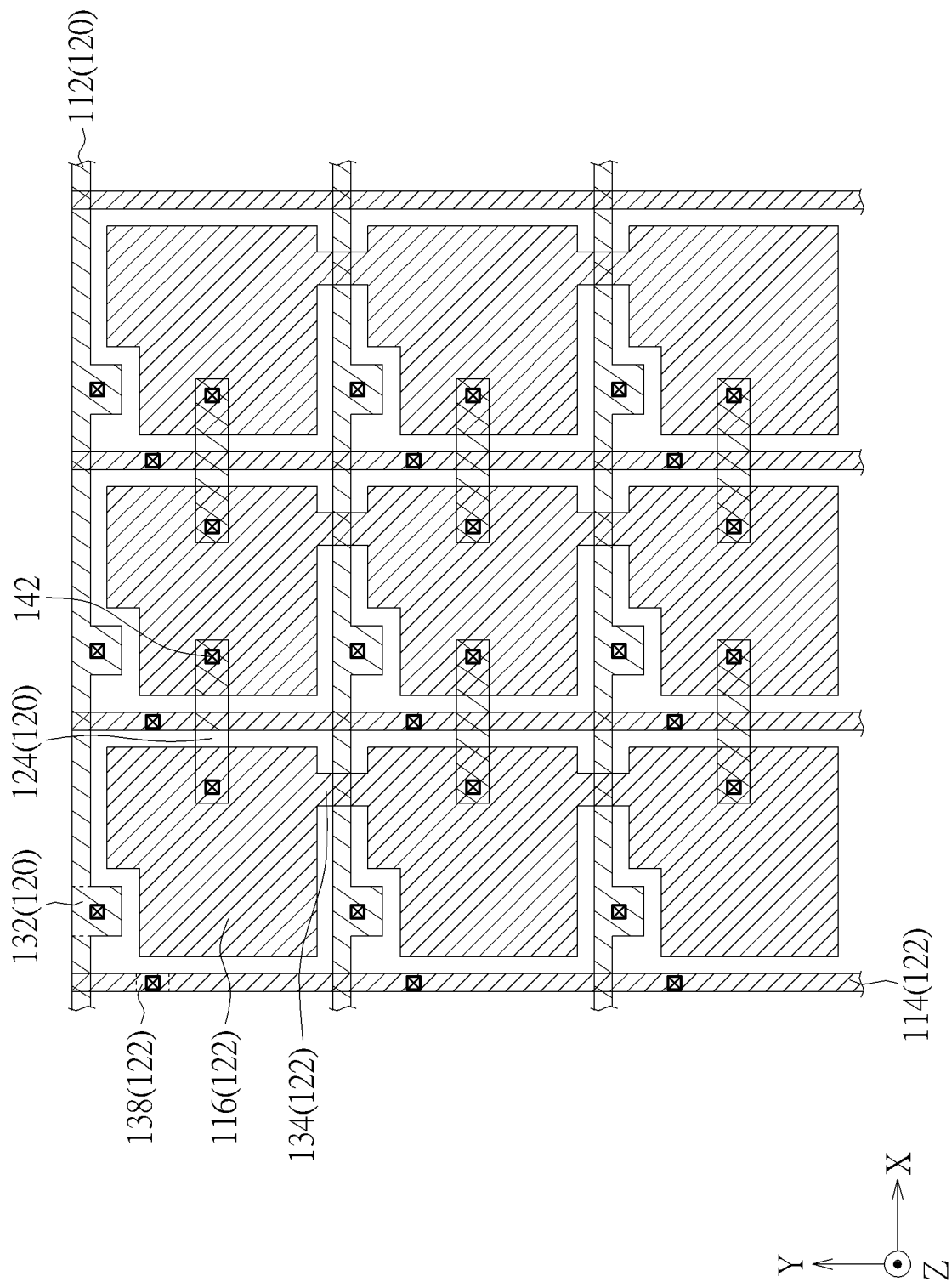
FIG. 5 is a schematic diagram illustrating a portion of a top view of a touch sensing structure of a second embodiment of the present invention.

Referring to FIG. 5, FIG. 5 is a schematic diagram illustrating a portion of a top view of a touch sensing structure of a second embodiment of the present invention. Different from the first embodiment, the sensing electrodes 116 of this embodiment are formed by the conductive layer 122. Therefore, the conductive layer 122 includes the sensing electrodes 116, but the conductive layer 120 does not include the sensing electrodes 116. Since the sensing electrodes 116 and the bridge lines 134 are both formed by the conductive layer 122, the bridge lines 134 can be directly connected to the sensing electrodes 116 in this embodiment, but not limited thereto.

In this embodiment, the insulating layer 126 may include a plurality of contact holes 142, and each of the contact holes 142 is corresponded to one of the sensing electrodes 116 and exposes a portion of a top surface of the bridge line 124. As shown in FIG. 5, a portion of the sensing electrode 116 can be filled into the contact hole 142, so that two adjacent sensing electrodes 116 in the direction X can be electrically connected to each other through one of the bridge lines 124.

Figure 6:
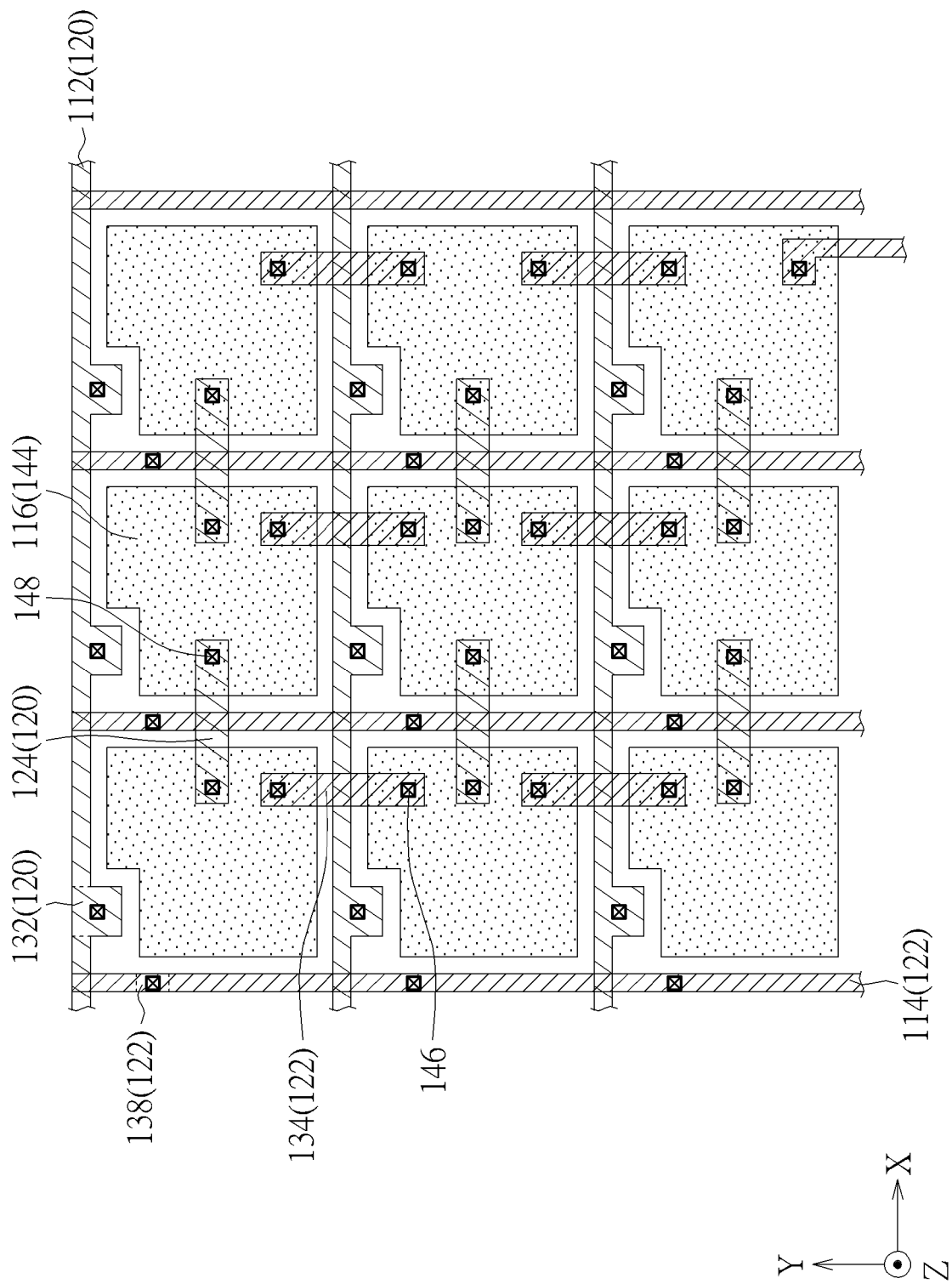
FIG. 6 is a schematic diagram illustrating a portion of a top view of a touch sensing structure of a third embodiment of the present invention.

Referring to FIG. 6, FIG. 6 is a schematic diagram illustrating a portion of a top view of a touch sensing structure of a third embodiment of the present invention. Different from the first embodiment, the display panel 10 of this embodiment further includes a conductive layer 144 (or referred to as the third conductive layer), and the conductive layer 144 includes the sensing electrodes 116. The conductive layer 144 is disposed on the conductive layer 122, and the light emitting elements 102 are disposed on the conductive layer 144. The conductive layer 144 may include metal, transparent conductive material or other suitable conductive materials. For example, the conductive layer 144 of this embodiment may include indium tin oxide (ITO), indium zinc oxide (IZO), aluminum zinc oxide (AZO) or other suitable transparent conductive materials, but not limited thereto.

The display panel 10 further includes an insulating layer (such as the insulating layer 128 in FIG. 4) disposed between the conductive layer 144 and the conductive layer 122. As shown in FIG. 6, the insulating layer between the conductive layer 144 and the conductive layer 122 includes a plurality of contact holes 146, each of the contact holes 146 is corresponded to one of the bridge lines 134 and exposes a portion of the top surface of the bridge line 134. Furthermore, a portion of the sensing electrode 116 can be filled into the contact hole 146 and contacted with a portion of the top surface of the bridge line 134, so that two adjacent sensing electrodes 116 in the direction Y can be electrically connected to each other through one of the bridge lines 134.

In addition, the insulating layer between the conductive layer 144 and the conductive layer 122 and the insulating layer 126 can include a plurality of contact holes 148, and each of the contact holes 148 is corresponded to one of the bridge lines 124 and exposes a portion of the top surface of the bridge line 124. Furthermore, another portion of the sensing electrode 116 can be filled into the contact hole 148 and contacted with a portion of the top surface of the bridge line 124, so that two adjacent sensing electrodes 116 in the direction X can be electrically connected to each other through one of the bridge lines 124.

In some embodiments, it is different from the third embodiment that the conductive layer 144 (or referred to as the third conductive layer) may include the bridge lines 124 and the bridge lines 134 in addition to the sensing electrodes 116. The bridge lines 124 are extended in the direction X, and two adjacent sensing electrodes 116 in the direction X can be electrically connected to each other through one of the bridge lines 124. The bridge lines 134 are extended in the direction Y, and two adjacent sensing electrodes 116 in the direction Y can be electrically connected to each other through one of the bridge lines 134.

Since the sensing electrodes 116, the bridge lines 124 and the bridge lines 134 are all formed by the conductive layer 144, the bridge lines 124 can be directly connected to the sensing electrodes 116, and the bridge lines 134 can be directly connected to the sensing electrode 116, but not limited thereto. Since the touch sensing structure 104 includes the sensing electrodes 116, the bridge lines 124 and the bridge lines 134, the conductive layer 144 can include at least a portion of the touch sensing structure 104.

Figure 7:
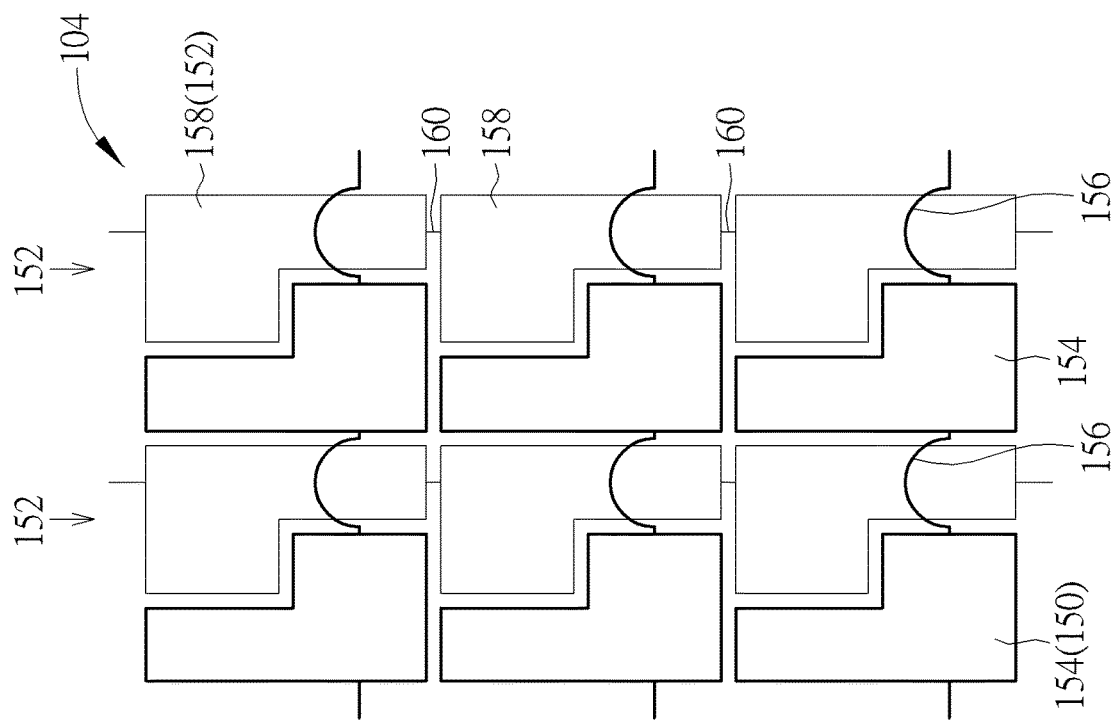
FIG. 7 is a schematic diagram illustrating a touch sensing structure of a fourth embodiment of the present invention.

FIG. 7 is a schematic diagram illustrating a touch sensing structure of a fourth embodiment of the present invention. The touch sensing structure 104 in FIG. 7 can be disposed on the substrate 100, and the substrate 100 and the light emitting elements 102 are omitted in FIG. 7. The touch sensing structure 104 of this embodiment may be a mutual-capacitance touch sensing structure, but not limited thereto. The touch sensing structure 104 includes a plurality of sensing electrode strings 150 (or referred to as the first sensing electrode strings) and a plurality of sensing electrode strings 152 (or referred to as the second sensing electrode strings). The sensing electrode strings 150 are extended in the direction X and the sensing electrode strings 152 are extended in the direction Y. The sensing electrode strings 150 may receive one of the transmission signal (Tx) and receiving signal (Rx), and the sensing electrode strings 152 may receive the other one of transmission signal and receiving signal.

Each of the sensing electrode strings 150 includes a plurality of sensing pads 154 and a plurality of bridge lines 156, and each of the sensing electrode strings 152 includes a plurality of sensing pads 158 and a plurality of bridge lines 160. The sensing pads 154 are disposed along the direction X, and two adjacent sensing pads 154 can be electrically connected to each other through one of the bridge lines 156. The sensing pads 158 are disposed along the direction Y, and two adjacent sensing pads 158 can be electrically connected to each other through one of the bridge lines 160. In addition, the contour of the sensing pad 154 may be "L" shape, the contour of the sensing pad 158 may be inverted "L" shape, and the contour of the adjacent sensing pad 154 and sensing pad 158 may approximately be a rectangle, but the present invention is not limited thereto.

Figure 8:
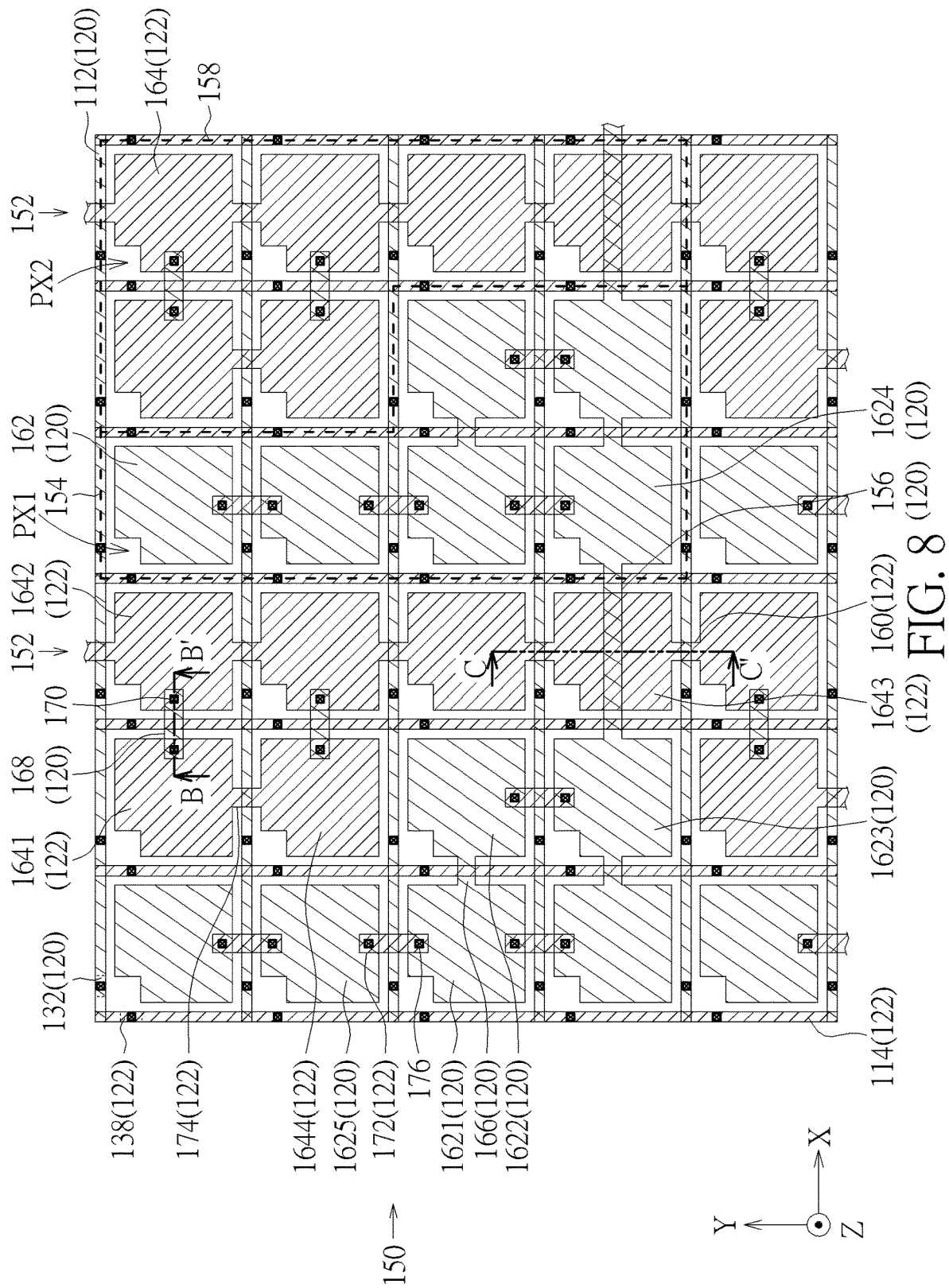
FIG. 8 is a schematic diagram illustrating a portion of a top view of the touch sensing structure of the fourth embodiment of the present invention.
Figure 9:
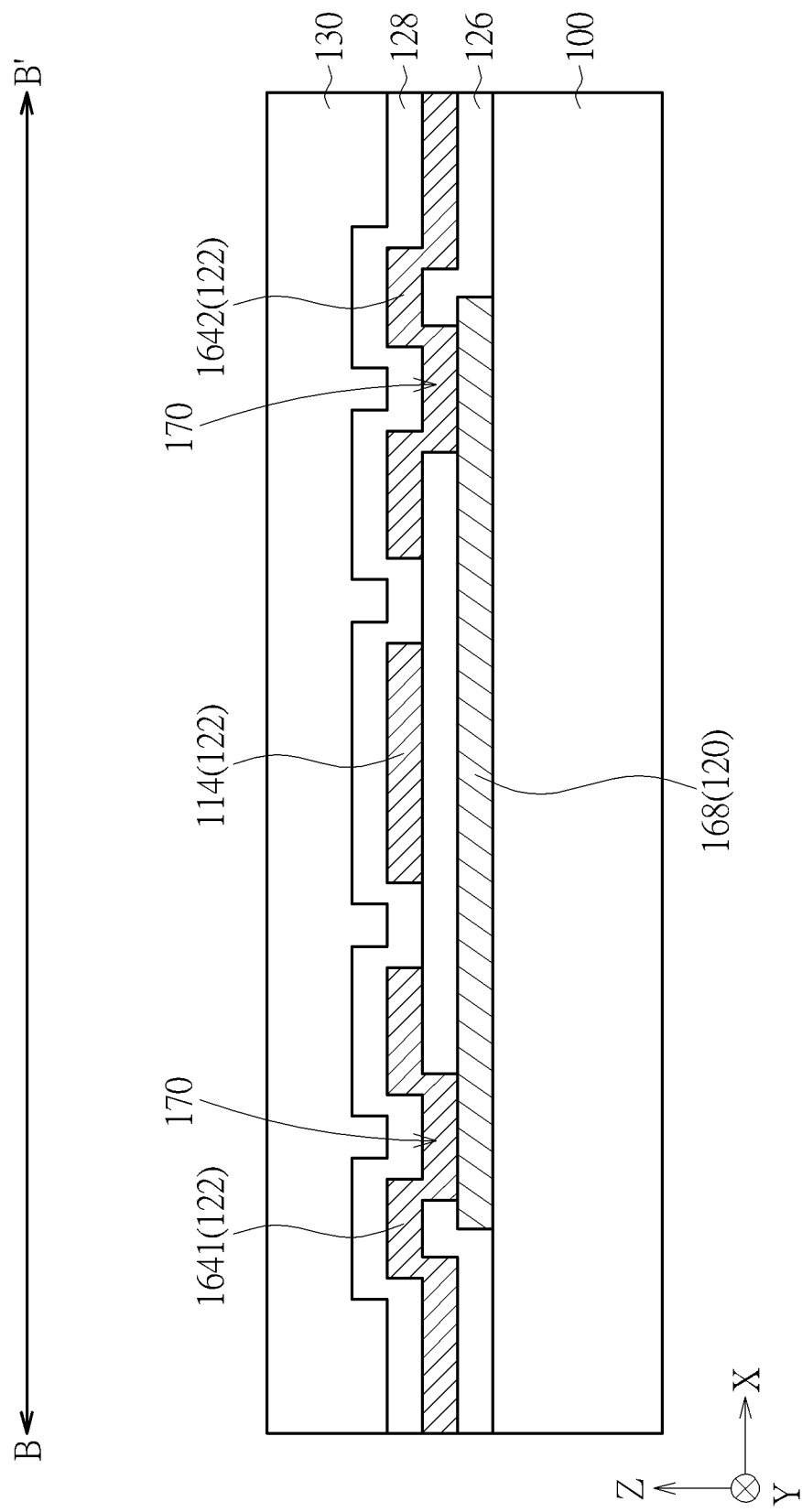
FIG. 9 is a schematic diagram illustrating a cross-sectional view along a line B-B' in FIG. 8.
Figure 10:
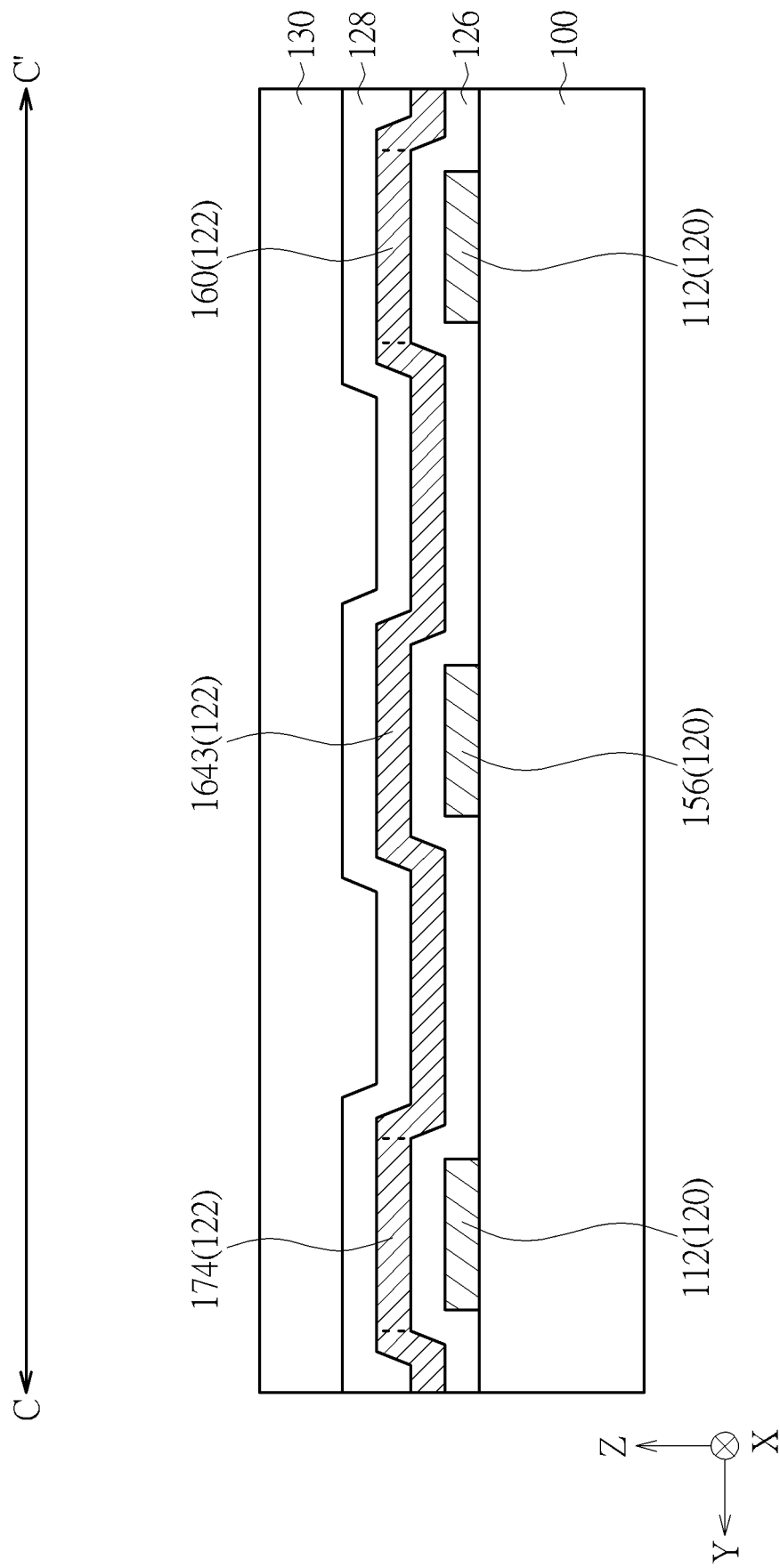
FIG. 10 is a schematic diagram illustrating a cross-sectional view along a line C-C' in FIG. 8.

Referring to FIG. 8 to FIG. 10, FIG. 8 is a schematic diagram illustrating a portion of a top view of the touch sensing structure of the fourth embodiment of the present invention, FIG. 9 is a schematic diagram illustrating a cross-sectional view along a line B-B' in FIG. 8, and FIG. 10 is a schematic diagram illustrating a cross-sectional view along a line C-C' in FIG. 8. In this embodiment, at least one of the first sensing electrode strings includes a plurality of first sensing electrodes, at least one of the second sensing electrode strings includes a plurality of second sensing electrodes, and the second sensing electrode strings are electrically isolated from the first sensing electrode strings. As shown in FIG. 8, each of the sensing pads 154 of the sensing electrode string 150 includes a plurality of sensing electrodes 162 (or referred to as the first sensing electrodes), and each of the sensing pads 158 of the sensing electrode string 152 includes a plurality of sensing electrodes 164 (or referred to as the second sensing electrodes).

The sensing electrodes 162 are electrically connected to each other, the sensing electrodes 164 are electrically connected to each other, and the sensing electrodes 162 are electrically isolated from the sensing electrodes 164. In addition, one of the sensing electrodes 162 is corresponded to one of the pixels PX1 (or referred to as the first pixels), and one of the sensing electrodes 164 is corresponded to one of the pixels PX2 (or referred to as the second pixels). For example, each of the sensing electrodes 162 may be disposed in one of the pixels PX1, and each of the sensing electrodes 164 may be disposed in one of the pixels PX2, but not limited thereto.

In this embodiment, the display panel 10 may include the conductive layer 120 (or referred to as the first conductive layer) and the conductive layer 122 (or referred to as the second conductive layer). The conductive layer 120 is disposed on the substrate 100, and the conductive layer 122 is disposed on the conductive layer 120. As shown in FIG. 9 or FIG. 10, the display panel 10 may include the insulating layer 126, the insulating layer 128 and the insulating layer 130. The insulating layer 126 is disposed between the conductive layer 120 and the conductive layer 122, the insulating layer 128 is disposed on the insulating layer 126, and the insulating layer 130 is disposed on the insulating layer 128.

The conductive layer 120 includes the electrode conducting lines 112, the sensing electrodes 162 and a plurality of first bridge lines. The first bridge lines can include bridge lines 166 (or referred to as the third bridge lines) and bridge lines 168 (or referred to as the fourth bridge lines), and the bridge lines 166 and the bridge lines 168 are extended in the direction X. Two adjacent sensing electrodes 162 in the direction X (such as the sensing electrodes 1621 and 1622 in FIG. 8) are electrically connected to each other through one of the bridge lines 166. Since the sensing electrodes 162 and the bridge lines 166 are both formed by the conductive layer 120, the bridge lines 166 can be directly connected to the sensing electrodes 162 in this embodiment, but not limited thereto.

In addition, two adjacent sensing electrodes 164 in the direction X (such as the sensing electrodes 1641 and 1642 in FIGS. 8 and 9) are electrically connected to each other through one of the bridge lines 168. Since the sensing electrodes 164 and the bridge lines 168 are formed by different conductive layers, the sensing electrodes 164 and the bridge lines 168 can be electrically connected to each other through the contact holes 170 in the insulating layer 126. As shown in FIG. 9, one of the contact holes 170 can be corresponded to the sensing electrode 1641 and expose a portion of the top surface of the bridge line 168, another one of the contact holes 170 can be corresponded to the sensing electrode 1642 and expose another portion of the top surface of the bridge line 168, and a portion of the sensing electrode 1641 and a portion of the sensing electrode 1642 respectively can be filled into the corresponding contact holes 170 so that the sensing electrode 1641 and the sensing electrode 1642 can be electrically connected to each other through one of the bridge lines 168.

As shown in FIG. 8 and FIG. 10, the conductive layer 120 further includes a plurality of bridge lines 156 (or referred to as the seventh bridge lines). In the direction X, one of the sensing electrodes 164 (such as the sensing electrode 1643) is disposed between a sensing electrode 1623 (or referred to as the third sensing electrode) and a sensing electrode 1624 (or referred to as the fourth sensing electrode) of the sensing electrodes 162. The sensing electrode 1623 and the sensing electrode 1624 are electrically connected to each other through one of the bridge lines 156, and the two adjacent sensing pads 154 can be electrically connected to each other through the bridge line 156.

The bridge line 156 may be projected on the surface 100s of the substrate 100, and the sensing electrode 1643 may also be projected on the surface 100s of the substrate 100, and a projection of the bridge line 156 may overlap a projection of the sensing electrode 1643 in the top view diagram. In other words, the bridge line 156 crosses the sensing electrode 1643. Since the touch sensing structure 104 can include the sensing electrodes 162 and the bridge lines 156, 166 and 168, the conductive layer 120 can include at least a portion of the touch sensing structure 104.

The conductive layer 122 includes the electrode conducting lines 114, the sensing electrodes 164 and a plurality of second bridge lines. The second bridge lines can include the bridge lines 172 (or referred to as the fifth bridge lines) and the bridge lines 174 (or referred to as the sixth bridge lines), and the bridge lines 172 and the bridge lines 174 are extended in the direction Y. Two adjacent sensing electrodes 162 in the direction Y (such as the sensing electrodes 1621 and 1625 in FIG. 8) are electrically connected to each other through one of the bridge lines 172.

Since the sensing electrodes 162 and the bridge lines 172 are formed by different conductive layers, the sensing electrodes 162 and the bridge lines 172 can be electrically connected to each other through the contact holes 176 in the insulating layer 126. As shown in FIG. 8, one of the contact holes 176 can be corresponded to the sensing electrode 1621 and expose a portion of the top surface of the sensing electrode 1621, and another one of the contact holes 176 can be corresponded to the sensing electrode 1625 and expose a portion of the top surface of the sensing electrode 1625. Two ends of one of the bridge lines 172 respectively can be filled into the corresponding contact holes 176, and the sensing electrode 1621 and the sensing electrode 1625 can be electrically connected to each other through one of the bridge lines 172.

In addition, two adjacent sensing electrodes 164 in the direction Y (such as the sensing electrodes 1641 and 1644 in FIG. 8) are electrically connected to each other through one of the bridge lines 174. Since the sensing electrodes 164 and the bridge lines 174 are both formed by the conductive layer 122, the bridge lines 174 can be directly connected to the sensing electrodes 164 in this embodiment, but not limited thereto. In addition, the conductive layer 122 also includes a bridge line 160 connecting two adjacent sensing pads 158. Since the touch sensing structure 104 can include the sensing electrodes 164 and the bridge lines 160, 172 and 174, the conductive layer 122 can include at least a portion of the touch sensing structure 104. In addition, in some embodiments, the sensing electrodes 162 can be formed by the conductive layer 122, and the sensing electrodes 164 can be formed by the conductive layer 120, but not limited thereto.

Figure 11:
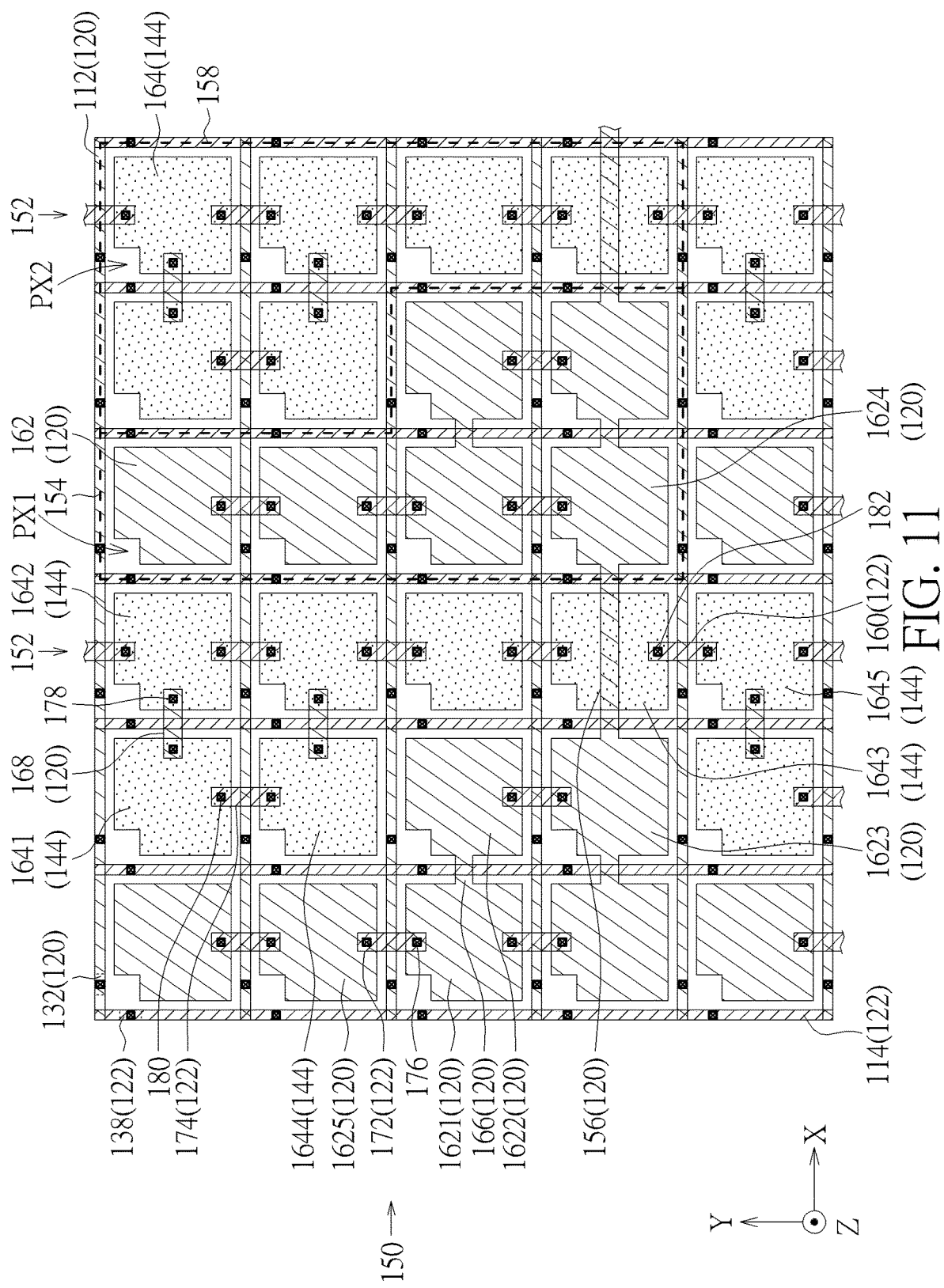
FIG. 11 is a schematic diagram illustrating a portion of a top view of a touch sensing structure of a fifth embodiment of the present invention.

Referring to FIG. 11, FIG. 11 is a schematic diagram illustrating a portion of a top view of a touch sensing structure of a fifth embodiment of the present invention. Different from the fourth embodiment, the display panel 10 of this embodiment further includes a conductive layer 144 (or referred to as the third conductive layer), and the conductive layer 144 includes the sensing electrodes 164. In this embodiment, the sensing electrodes 162 are formed by the conductive layer 120, and the sensing electrodes 164 are formed by the conductive layer 144. The conductive layer 144 is disposed on the conductive layer 122. The conductive layer 144 may include metal, transparent conductive material or other suitable conductive materials. For example, the conductive layer 144 of this embodiment may include indium tin oxide (ITO), indium zinc oxide (IZO), aluminum zinc oxide (AZO) or other suitable transparent conductive materials, but not limited thereto.

The display panel 10 further includes an insulating layer (such as the insulating layer 128 in FIG. 10) disposed between the conductive layer 144 and the conductive layer 122, and the insulating layer 126 and the insulating layer between the conductive layer 144 and the conductive layer 122 include a plurality of contact holes 178. As shown in FIG. 11, one of the contact holes 178 can be corresponded to the sensing electrode 1641 and expose a portion of the top surface of the bridge line 168, another one of the contact holes 178 can be corresponded to the sensing electrode 1642 and expose another portion of the top surface of the bridge line 168, and a portion of the sensing electrode 1641 and a portion of the sensing electrode 1642 respectively can be filled into the corresponding contact holes 178, so that the sensing electrode 1641 and the sensing electrode 1642 can be electrically connected to each other through one of the bridge lines 168.

The insulating layer between the conductive layer 144 and the conductive layer 122 further includes a plurality of contact holes 180. As shown in FIG. 11, one of the contact holes 180 can be corresponded to the sensing electrode 1641 and expose a portion of the top surface of the bridge line 174, another one of the contact holes 180 can be corresponded to the sensing electrode 1644 and expose another portion of the top surface of the bridge line 174, and a portion of the sensing electrode 1641 and a portion of the sensing electrode 1644 respectively can be filled into the corresponding contact holes 180, so that the sensing electrode 1641 and the sensing electrode 1644 can be electrically connected to each other through one of the bridge lines 174.

In addition, the insulating layer between the conductive layer 144 and the conductive layer 122 further includes a plurality of contact holes 182. As shown in FIG. 11, the sensing electrode 1643 and the sensing electrode 1645 of two adjacent sensing pads 158 can be electrically connected through one of the bridge lines 160, one of the contact holes 182 can be corresponded to the sensing electrode 1643 and expose a portion of the top surface of the bridge line 160, and another one of the contact holes 182 can be corresponded to the sensing electrode 1645 and expose another portion of the top surface of the bridge line 160. A portion of the sensing electrode 1643 and a portion of the sensing electrode 1645 respectively can be filled into the corresponding contact holes 182, and the sensing electrode 1643 and the sensing electrode 1645 can be electrically connected to each other through one of the bridge lines 160.

Different from the fifth embodiment, the conductive layer 144 (or referred to as the third conductive layer) may include the bridge lines 168 and the bridge lines 174 in addition to the sensing electrodes 164 in some embodiments. Two adjacent sensing electrodes 164 in the direction X (such as the sensing electrodes 1641 and 1642 in FIG. 11) are electrically connected to each other through one of the bridge lines 168. Since the sensing electrodes 164 and the bridge lines 168 are both formed by the conductive layer 144, the bridge lines 168 can be directly connected to the sensing electrodes 164, but not limited thereto.

In addition, two adjacent sensing electrodes 164 in the direction Y (such as the sensing electrodes 1641 and 1644 in FIG. 11) are electrically connected to each other through one of the bridge lines 174. Since the sensing electrodes 164 and the bridge lines 174 are both formed by the conductive layer 144, the bridge lines 174 of this embodiment can be directly connected to the sensing electrodes 164, but not limited thereto. In addition, the conductive layer 144 also includes the bridge line 160 connecting two adjacent sensing pads 158. Since the touch sensing structure 104 can include the sensing electrodes 164 and the bridge lines 160, 168 and 174, the conductive layer 144 can include at least a portion of the touch sensing structure 104.

Under these circumstances, the bridge lines 166 of the conductive layer 120 can be referred to as the first bridge lines, the bridge lines 172 of the conductive layer 122 can be referred to as the second bridge lines, the bridge lines 168 of the conductive layer 144 can be referred to as the third bridge lines, and the bridge lines 174 of the conductive layer 144 can be referred to as the fourth bridge lines.

Figure 12:
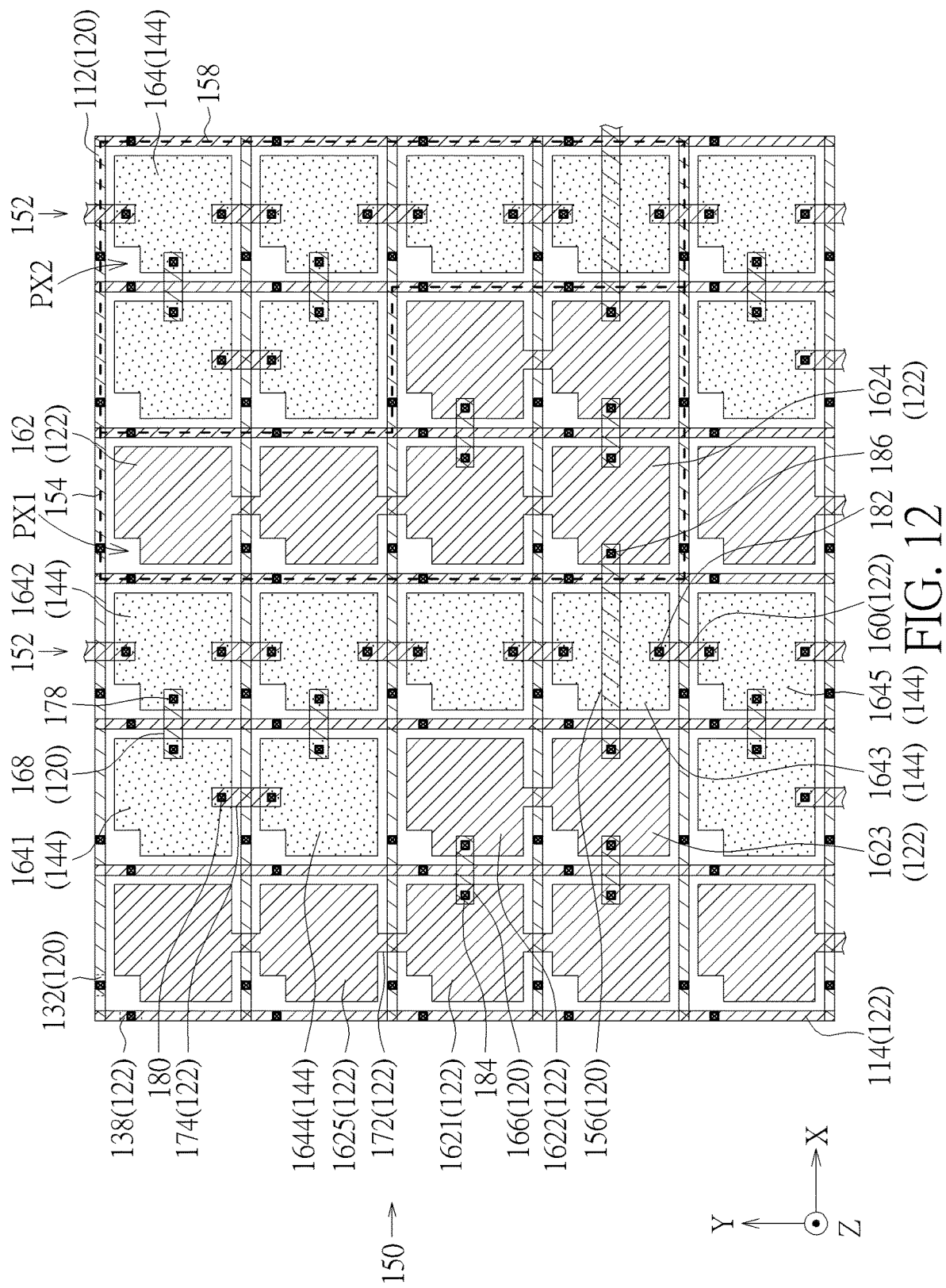
FIG. 12 is a schematic diagram illustrating a portion of a top view of a touch sensing structure of a sixth embodiment of the present invention.

Referring to FIG. 12, FIG. 12 is a schematic diagram illustrating a portion of a top view of a touch sensing structure of a sixth embodiment of the present invention. Different from the fifth embodiment, the sensing electrodes 162 of this embodiment are formed by the conductive layer 122, and the sensing electrodes 164 are formed by the conductive layer 144. As shown in FIG. 12, adjacent sensing electrodes 1621 and 1625 are electrically connected to each other through the bridge line 172. Since the sensing electrodes 1621 and 1625 and the bridge line 172 may all be formed by the conductive layer 122, the bridge line 172 of this embodiment can be directly connected to the sensing electrodes 1621 and 1625, but not limited thereto.

As shown in FIG. 12, adjacent sensing electrodes 1621 and 1622 are electrically connected to each other through one of the bridge lines 166. The insulating layer 126 of this embodiment can include a plurality of contact holes 184, one of the contact holes 184 can be corresponded to the sensing electrode 1621 and expose a portion of the top surface of the bridge line 166, and another one of the contact holes 184 can be corresponded to the sensing electrode 1622 and expose another portion of the top surface of the bridge line 166. A portion of the sensing electrode 1621 and a portion of the sensing electrode 1622 respectively can be filled into the corresponding contact holes 184, and the sensing electrode 1621 and the sensing electrode 1622 can be electrically connected to each other through one of the bridge lines 166.

In addition, as shown in FIG. 12, the sensing electrode 1623 and the sensing electrode 1624 of two adjacent sensing pads 154 can be electrically connected through one of the bridge lines 156. In this embodiment, the insulating layer 126 may include a plurality of contact holes 186, one of the contact holes 186 can be corresponded to the sensing electrode 1623 and expose a portion of the top surface of the bridge line 156, and another one of the contact holes 186 can be corresponded to the sensing electrode 1624 and expose another portion of the top surface of the bridge line 156. A portion of the sensing electrode 1623 and a portion of the sensing electrode 1624 respectively can be filled into the corresponding contact holes 186, and two adjacent sensing pads 154 can be electrically connected to each other through one of the bridge lines 156.

Different from the sixth embodiment, the conductive layer 144 (or referred to as the third conductive layer) may include the bridge lines 168 and the bridge lines 174 in addition to the sensing electrodes 164 in some embodiments. Two adjacent sensing electrodes 164 in the direction X (such as the sensing electrodes 1641 and 1642 in FIG. 12) are electrically connected to each other through one of the bridge lines 168. Since the sensing electrodes 164 and the bridge lines 168 are both formed by the conductive layer 144, the bridge lines 168 can be directly connected to the sensing electrodes 164, but not limited thereto.

In addition, two adjacent sensing electrodes 164 in the direction Y (such as the sensing electrodes 1641 and 1644 in FIG. 12) are electrically connected to each other through one of the bridge lines 174. Since the sensing electrodes 164 and the bridge lines 174 are both formed by the conductive layer 144, the bridge lines 174 of this embodiment can be directly connected to the sensing electrodes 164, but not limited thereto. In addition, the conductive layer 144 also includes the bridge line 160 connecting two adjacent sensing pads 158. Since the touch sensing structure 104 can include the sensing electrodes 164 and the bridge lines 160, 168 and 174, the conductive layer 144 can include at least a portion of the touch sensing structure 104.

Under these circumstances, the bridge lines 166 of the conductive layer 120 can be referred to as the first bridge lines, the bridge lines 172 of the conductive layer 122 can be referred to as the second bridge lines, the bridge lines 168 of the conductive layer 144 can be referred to as the third bridge lines, and the bridge lines 174 of the conductive layer 144 can be referred to as the fourth bridge lines.

In some embodiments, the conductive layer 144 (or referred to as the third conductive layer) may include the sensing electrodes 162, the bridge lines 166 and the bridge lines 172 in addition to the sensing electrodes 164, the bridge lines 168 and the bridge lines 174. The technical features of the sensing electrodes 164, the bridge lines 168 and the bridge lines 174 have been introduced in the above paragraphs, and will not be repeated here.

Two adjacent sensing electrodes 162 in the direction X (such as the sensing electrodes 1621 and 1622 in FIG. 12) are electrically connected to each other through one of the bridge lines 166. Since the sensing electrodes 162 and the bridge lines 166 are both formed by the conductive layer 144, the bridge lines 166 of this embodiment can be directly connected to the sensing electrodes 162, but not limited thereto.

Two adjacent sensing electrodes 162 in the direction Y (such as the sensing electrodes 1621 and 1625 in FIG. 12) are electrically connected to each other through one of the bridge lines 172. Since the sensing electrodes 162 and the bridge lines 172 are both formed by the conductive layer 144, the bridge lines 172 of this embodiment can be directly connected to the sensing electrodes 162, but not limited thereto.

In addition, as shown in FIG. 12, the sensing electrode 1623 and the sensing electrode 1624 of two adjacent sensing pads 154 can be electrically connected through one of the bridge lines 156 of the conductive layer 120, and the projection of the bridge line 156 can overlap the projection of the sensing electrode 1643 in the top view diagram. One of the contact holes 186 can be corresponded to the sensing electrode 1623 and expose a portion of the top surface of the bridge line 156, and another one of the contact holes 186 can be corresponded to the sensing electrode 1624 and expose another portion of the top surface of the bridge line 156. A portion of the sensing electrode 1623 and a portion of the sensing electrode 1624 respectively can be filled into the corresponding contact holes 186, and two adjacent sensing pads 154 can be electrically connected to each other through one of the bridge lines 156.

Referring to FIG. 13, FIG. 13 is a schematic diagram illustrating a display device of a seventh embodiment of the present invention. A display device 1 of this embodiment includes a display panel 20 and a backlight module 30. The display panel 20 may be a non-self-luminous display panel.

For example, the display panel 20 may be a liquid crystal display panel, but not limited thereto. The display panel 20 includes a substrate 201, a substrate 202 and a liquid crystal layer 203, but not limited thereto. The substrate 201 and the substrate 202 are disposed opposite to each other in the direction Z, and the liquid crystal layer 203 is disposed between the substrate 201 and the substrate 202, but not limited thereto.

As shown in FIG. 13, the backlight module 30 is disposed on a side of the display panel 20 in the direction Z. The backlight module 30 includes a substrate 300, a plurality of light emitting elements 302 and a touch sensing structure 304. The touch sensing structure 304 is disposed on the substrate 300 on a side of the light emitting elements 302 that is away from a light emitting surface 302s of the light emitting elements 302, or the touch sensing structure 304 is disposed between the substrate 300 and the light emitting elements 302.

The backlight module 30 can include a multilayer structure 306 disposed between the substrate 300 and the light emitting elements 302. The multilayer structure 306 can include a plurality of conductive layers and a plurality of insulating layers. The conductive layers and the insulating layers can be used for forming the touch sensing structure 304, but not limited thereto. In addition, at least one of the conductive layers can be used for forming a plurality of contacts, and the light emitting elements 302 can be electrically connected to the electrode conducting lines on the substrate 300 through the contacts. Therefore, the conductive layer of this embodiment can include at least a portion of the touch sensing structure 304 and contacts.

The substrate 300, the light emitting elements 302 and the touch sensing structure 304 in the backlight module 30 of this embodiment can be the same as the substrate 100, the light emitting elements 102 and the touch sensing structure 104 in the first embodiment, but not limited thereto. In addition, the touch sensing structures in the second to sixth embodiments can also be applied to the touch sensing structure 304 in the backlight module 30 of this embodiment.

In the display panel and the display device of the present invention, the conductive layer having the electrode conducting lines used for driving the light emitting elements can also be used to form the touch sensing structure, thereby reducing the thickness or weight of the product. In addition, the manufacturing process of the touch sensing structure can be integrated into part of the manufacturing process of light emitting elements (such as the substrate having mini or micro LEDs), thereby saving the time and cost in the manufacturing process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
   a first substrate;
   a plurality of light emitting elements disposed on the first substrate;
   a touch sensing structure disposed on the first substrate, wherein the touch sensing structure is disposed on a side of the plurality of light emitting elements away from a light emitting surface of the plurality of light emitting elements;
   a conductive layer disposed between the plurality of light emitting elements and the first substrate, wherein the conductive layer comprises at least a portion of the touch sensing structure, a plurality of first contacts or a plurality of second contacts, and the plurality of light emitting elements are electrically connected to the plurality of first contacts and the plurality of second contacts;
   a plurality of first electrode conducting lines and a plurality of second electrode conducting lines, wherein the plurality of first electrode conducting lines are extended in a first direction, the plurality of second electrode conducting lines are extended in a second direction, a plurality of pixels are defined by the plurality of first electrode conducting lines and the plurality of second electrode conducting lines crossing each other, and one of the plurality of light emitting elements is electrically connected to one of the plurality of first electrode conducting lines and one of the plurality of second electrode conducting lines, wherein the touch sensing structure comprises a plurality of sensing electrodes electrically connected to each other, and one of the plurality of sensing electrodes is corresponded to one of the plurality of pixels;
   a first conductive layer disposed on the first substrate, and the first conductive layer comprising:
     the plurality of first electrode conducting lines;
     the plurality of first contacts electrically connected to the plurality of first electrode conducting lines;
     the plurality of sensing electrodes; and
     a plurality of first bridge lines extending in the first direction, wherein two adjacent ones of the plurality of sensing electrodes in the first direction are electrically connected to each other through one of the plurality of first bridge lines; and
   a second conductive layer disposed on the first conductive layer, wherein the plurality of light emitting elements are disposed on the second conductive layer, and the second conductive layer comprises:
     the plurality of second electrode conducting lines;
     the plurality of second contacts electrically connected to the plurality of second electrode conducting lines; and
     a plurality of second bridge lines extending in the second direction, wherein two adjacent ones of the plurality of sensing electrodes in the second direction are electrically connected to each other through one of the plurality of second bridge lines,
   wherein the conductive layer is the first conductive layer or the second conductive layer.

2. A display panel, comprising:
   a first substrate;
   a plurality of light emitting elements disposed on the first substrate;
   a touch sensing structure disposed on the first substrate, wherein the touch sensing structure is disposed on a side of the plurality of light emitting elements away from a light emitting surface of the plurality of light emitting elements;
   a conductive layer disposed between the plurality of light emitting elements and the first substrate, wherein the conductive layer comprises at least a portion of the touch sensing structure, a plurality of first contacts or a plurality of second contacts, and the plurality of light emitting elements are electrically connected to the plurality of first contacts and the plurality of second contacts;

a plurality of first electrode conducting lines and a plurality of second electrode conducting lines, wherein the plurality of first electrode conducting lines are extended in a first direction, the plurality of second electrode conducting lines are extended in a second direction, a plurality of pixels are defined by the plurality of first electrode conducting lines and the plurality of second electrode conducting lines crossing each other, and one of the plurality of light emitting elements is electrically connected to one of the plurality of first electrode conducting lines and one of the plurality of second electrode conducting lines, wherein the touch sensing structure comprises a plurality of sensing electrodes electrically connected to each other, and one of the plurality of sensing electrodes is corresponded to one of the plurality of pixels;

a first conductive layer disposed on the first substrate, and the first conductive layer comprising:
the plurality of first electrode conducting lines;
the plurality of first contacts electrically connected to the plurality of first electrode conducting lines; and
a plurality of first bridge lines extending in the first direction, wherein two adjacent ones of the plurality of sensing electrodes in the first direction are electrically connected to each other through one of the plurality of first bridge lines; and a second conductive layer disposed on the first conductive layer, wherein the plurality of light emitting elements are disposed on the second conductive layer, and the second conductive layer comprises:
the plurality of second electrode conducting lines;
the plurality of second contacts electrically connected to the plurality of second electrode conducting lines;
the plurality of sensing electrodes; and
a plurality of second bridge lines extending in the second direction, wherein two adjacent ones of the plurality of sensing electrodes in the second direction are electrically connected to each other through one of the plurality of second bridge lines, wherein the conductive layer is the first conductive layer or the second conductive layer.

3. A display panel, comprising:
a first substrate;
a plurality of light emitting elements disposed on the first substrate;
a touch sensing structure disposed on the first substrate, wherein the touch sensing structure is disposed on a side of the plurality of light emitting elements away from a light emitting surface of the plurality of light emitting elements;
a conductive layer disposed between the plurality of light emitting elements and the first substrate, wherein the conductive layer comprises at least a portion of the touch sensing structure, a plurality of first contacts or a plurality of second contacts, and the plurality of light emitting elements are electrically connected to the plurality of first contacts and the plurality of second contacts;
a plurality of first electrode conducting lines and a plurality of second electrode conducting lines, wherein the plurality of first electrode conducting lines are extended in a first direction, the plurality of second electrode conducting lines are extended in a second direction, a plurality of pixels are defined by the plurality of first electrode conducting lines and the plurality of second electrode conducting lines crossing each other, and one of the plurality of light emitting elements is electrically connected to one of the plurality of first electrode conducting lines and one of the plurality of second electrode conducting lines, wherein the touch sensing structure comprises a plurality of sensing electrodes electrically connected to each other, and one of the plurality of sensing electrodes is corresponded to one of the plurality of pixels;

a first conductive layer disposed on the first substrate, and the first conductive layer comprising:
the plurality of first electrode conducting lines;
the plurality of first contacts electrically connected to the plurality of first electrode conducting lines; and
a plurality of first bridge lines extending in the first direction, wherein two adjacent ones of the plurality of sensing electrodes in the first direction are electrically connected to each other through one of the plurality of first bridge lines;

a second conductive layer disposed on the first conductive layer, and the second conductive layer comprising:
the plurality of second electrode conducting lines;
the plurality of second contacts electrically connected to the plurality of second electrode conducting lines; and
a plurality of second bridge lines extending in the second direction, wherein two adjacent ones of the plurality of sensing electrodes in the second direction are electrically connected to each other through one of the plurality of second bridge lines; and a third conductive layer disposed on the second conductive layer, wherein the plurality of light emitting elements are disposed on the third conductive layer, and the third conductive layer comprises the plurality of sensing electrodes, wherein the conductive layer is the first conductive layer or the second conductive layer.

4. A display panel, comprising:
a first substrate;
a plurality of light emitting elements disposed on the first substrate;
a touch sensing structure disposed on the first substrate, wherein the touch sensing structure is disposed on a side of the plurality of light emitting elements away from a light emitting surface of the plurality of light emitting elements;
a conductive layer disposed between the plurality of light emitting elements and the first substrate, wherein the conductive layer comprises at least a portion of the touch sensing structure, a plurality of first contacts or a plurality of second contacts, and the plurality of light emitting elements are electrically connected to the plurality of first contacts and the plurality of second contacts;
a plurality of first electrode conducting lines and a plurality of second electrode conducting lines, wherein the plurality of first electrode conducting lines are extended in a first direction, the plurality of second electrode conducting lines are extended in a second direction, a plurality of pixels are defined by the plurality of first electrode conducting lines and the plurality of second electrode conducting lines crossing each other, and one of the plurality of light emitting elements is electrically connected to one of the plurality of first electrode conducting lines and one of the plurality of second electrode conducting lines, wherein the touch sensing structure comprises a plurality of sensing electrodes electrically connected to each other, and one of the plurality of sensing electrodes is corresponded to one of the plurality of pixels;
a first conductive layer disposed on the first substrate, and the first conductive layer comprising:
the plurality of first electrode conducting lines; and
the plurality of first contacts electrically connected to the plurality of first electrode conducting lines;
a second conductive layer disposed on the first conductive layer, and the second conductive layer comprising:
the plurality of second electrode conducting lines; and
the plurality of second contacts electrically connected to the plurality of second electrode conducting lines; and
a third conductive layer disposed on the second conductive layer, wherein the plurality of light emitting elements are disposed on the third conductive layer, and the third conductive layer comprises:
the plurality of sensing electrodes;
a plurality of first bridge lines extending in the first direction, wherein two adjacent ones of the plurality of sensing electrodes in the first direction are electrically connected to each other through one of the plurality of first bridge lines; and
a plurality of second bridge lines extending in the second direction, wherein two adjacent ones of the plurality of sensing electrodes in the second direction are electrically connected to each other through one of the plurality of second bridge lines,
wherein the conductive layer is the first conductive layer, the second conductive layer or the third conductive layer.

5. A display panel, comprising:
a first substrate;
a plurality of light emitting elements disposed on the first substrate;
a touch sensing structure disposed on the first substrate, wherein the touch sensing structure is disposed on a side of the plurality of light emitting elements away from a light emitting surface of the plurality of light emitting elements;
a conductive layer disposed between the plurality of light emitting elements and the first substrate, wherein the conductive layer comprises at least a portion of the touch sensing structure, a plurality of first contacts or a plurality of second contacts, and the plurality of light emitting elements are electrically connected to the plurality of first contacts and the plurality of second contacts;
a plurality of first electrode conducting lines and a plurality of second electrode conducting lines, wherein the plurality of first electrode conducting lines are extended in a first direction, the plurality of second electrode conducting lines are extended in a second direction, a plurality of pixels are defined by the plurality of first electrode conducting lines and the plurality of second electrode conducting lines crossing each other, and one of the plurality of light emitting elements is electrically connected to one of the plurality of first electrode conducting lines and one of the plurality of second electrode conducting lines, wherein the touch sensing structure comprises:
a plurality of first sensing electrode strings extending in the first direction, wherein at least one of the plurality of first sensing electrode strings comprises a plurality of first sensing electrodes electrically connected to each other, and one of the plurality of first sensing electrodes is corresponded to a first pixel of the plurality of pixels; and
a plurality of second sensing electrode strings extending in the second direction and electrically isolated from the plurality of first sensing electrode strings, wherein at least one of the plurality of second sensing electrode strings comprises a plurality of second sensing electrodes electrically connected to each other, and one of the plurality of second sensing electrodes is corresponded to a second pixel of the plurality of pixels.

6. The display panel of claim 5, further comprising:
a first conductive layer disposed on the first substrate, and the first conductive layer comprising:
the plurality of first electrode conducting lines;
the plurality of first contacts electrically connected to the plurality of first electrode conducting lines;
the plurality of first sensing electrodes; and
a plurality of first bridge lines extending in the first direction, wherein two adjacent ones of the plurality of first sensing electrodes in the first direction are electrically connected to each other through a third bridge line of the plurality of first bridge lines, and two adjacent ones of the plurality of second sensing electrodes in the first direction are electrically connected to each other through a fourth bridge line of the plurality of first bridge lines; and
a second conductive layer disposed on the first conductive layer, wherein the plurality of light emitting elements are disposed on the second conductive layer, and the second conductive layer comprises:
the plurality of second electrode conducting lines;
the plurality of second contacts electrically connected to the plurality of second electrode conducting lines;
the plurality of second sensing electrodes; and
a plurality of second bridge lines extending in the second direction, wherein two adjacent ones of the plurality of first sensing electrodes in the second direction are electrically connected to each other through a fifth bridge line of the plurality of second bridge lines, and two adjacent ones of the plurality of second sensing electrodes in the second direction are electrically connected to each other through a sixth bridge line of the plurality of second bridge lines,
wherein the conductive layer is the first conductive layer or the second conductive layer.

7. The display panel of claim 6, wherein the first conductive layer further comprises a plurality of seventh bridge lines, one of the plurality of second sensing electrodes is disposed between a third sensing electrode and a fourth sensing electrode of the plurality of first sensing electrodes in the first direction, the third sensing electrode is electrically connected to the fourth sensing electrode through one of the plurality of seventh bridge lines, and a projection of the one of the plurality of seventh bridge lines overlaps a projection of the one of the plurality of second sensing electrodes.

8. The display panel of claim 5, further comprising:
a first conductive layer disposed on the first substrate, and the first conductive layer comprising:
the plurality of first electrode conducting lines;
the plurality of first contacts electrically connected to the plurality of first electrode conducting lines;
the plurality of first sensing electrodes; and
a plurality of first bridge lines extending in the first direction, wherein two adjacent ones of the plurality of first sensing electrodes in the first direction are electrically connected to each other through a third bridge line of the plurality of first bridge lines, and two adjacent ones of the plurality of second sensing electrodes in the first direction are electrically connected to each other through a fourth bridge line of the plurality of first bridge lines;

a second conductive layer disposed on the first conductive layer, and the second conductive layer comprising:
the plurality of second electrode conducting lines;
the plurality of second contacts electrically connected to the plurality of second electrode conducting lines; and
a plurality of second bridge lines extending in the second direction, wherein two adjacent ones of the plurality of first sensing electrodes in the second direction are electrically connected to each other through a fifth bridge line of the plurality of second bridge lines, and two adjacent ones of the plurality of second sensing electrodes in the second direction are electrically connected to each other through a sixth bridge line of the plurality of second bridge lines; and a third conductive layer disposed on the second conductive layer, wherein the plurality of light emitting elements are disposed on the third conductive layer, and the third conductive layer comprises the plurality of second sensing electrodes, wherein the conductive layer is the first conductive layer or the second conductive layer.

9. The display panel of claim 5, further comprising:
a first conductive layer disposed on the first substrate, and the first conductive layer comprising:
the plurality of first electrode conducting lines;
the plurality of first contacts electrically connected to the plurality of first electrode conducting lines;
the plurality of first sensing electrodes; and
a plurality of first bridge lines extending in the first direction, wherein two adjacent ones of the plurality of first sensing electrodes in the first direction are electrically connected to each other through one of the plurality of first bridge lines;

a second conductive layer disposed on the first conductive layer, and the second conductive layer comprising:
the plurality of second electrode conducting lines;
the plurality of second contacts electrically connected to the plurality of second electrode conducting lines; and
a plurality of second bridge lines extending in the second direction, wherein two adjacent ones of the plurality of first sensing electrodes in the second direction are electrically connected to each other through one of the plurality of second bridge lines; and a third conductive layer disposed on the second conductive layer, wherein the plurality of light emitting elements are disposed on the third conductive layer, and the third conductive layer comprises:
the plurality of second sensing electrodes;
a plurality of third bridge lines extending in the first direction, wherein two adjacent ones of the plurality of second sensing electrodes in the first direction are electrically connected to each other through one of the plurality of third bridge lines; and
a plurality of fourth bridge lines extending in the second direction, wherein two adjacent ones of the plurality of second sensing electrodes in the second direction are electrically connected to each other through one of the plurality of fourth bridge lines, wherein the conductive layer is the first conductive layer, the second conductive layer or the third conductive layer.

10. The display panel of claim 5, further comprising:
a first conductive layer disposed on the first substrate, and the first conductive layer comprising:
the plurality of first electrode conducting lines;
the plurality of first contacts electrically connected to the plurality of first electrode conducting lines; and
a plurality of first bridge lines extending in the first direction, wherein two adjacent ones of the plurality of first sensing electrodes in the first direction are electrically connected to each other through a third bridge line of the plurality of first bridge lines, and two adjacent ones of the plurality of second sensing electrodes in the first direction are electrically connected to each other through a fourth bridge line of the plurality of first bridge lines;

a second conductive layer disposed on the first conductive layer, and the second conductive layer comprising:
the plurality of second electrode conducting lines;
the plurality of second contacts electrically connected to the plurality of second electrode conducting lines;
the plurality of first sensing electrodes; and
a plurality of second bridge lines extending in the second direction, wherein two adjacent ones of the plurality of first sensing electrodes in the second direction are electrically connected to each other through a fifth bridge line of the plurality of second bridge lines, and two adjacent ones of the plurality of second sensing electrodes in the second direction are electrically connected to each other through a sixth bridge line of the plurality of second bridge lines; and a third conductive layer disposed on the second conductive layer, wherein the plurality of light emitting elements are disposed on the third conductive layer, and the third conductive layer comprises the plurality of second sensing electrodes, wherein the conductive layer is the first conductive layer or the second conductive layer.

11. The display panel of claim 5, further comprising:
a first conductive layer disposed on the first substrate, and the first conductive layer comprising:
the plurality of first electrode conducting lines;
the plurality of first contacts electrically connected to the plurality of first electrode conducting lines; and
a plurality of first bridge lines extending in the first direction, wherein two adjacent ones of the plurality of first sensing electrodes in the first direction are electrically connected to each other through one of the plurality of first bridge lines;

a second conductive layer disposed on the first conductive layer, and the second conductive layer comprising:
the plurality of second electrode conducting lines;
the plurality of second contacts electrically connected to the plurality of second electrode conducting lines;
the plurality of first sensing electrodes; and
a plurality of second bridge lines extending in the second direction, wherein two adjacent ones of the plurality of first sensing electrodes in the second direction are electrically connected to each other through one of the plurality of second bridge lines; and a third conductive layer disposed on the second conductive layer, wherein the plurality of light emitting elements are disposed on the third conductive layer, and the third conductive layer comprises:
  the plurality of second sensing electrodes;
  a plurality of third bridge lines extending in the first direction, wherein two adjacent ones of the plurality of second sensing electrodes in the first direction are electrically connected to each other through one of the plurality of third bridge lines; and
  a plurality of fourth bridge lines extending in the second direction, wherein two adjacent ones of the plurality of second sensing electrodes in the second direction are electrically connected to each other through one of the plurality of fourth bridge lines,
wherein the conductive layer is the first conductive layer, the second conductive layer or the third conductive layer.

12. The display panel of claim 5, further comprising:
a first conductive layer disposed on the first substrate, and the first conductive layer comprising:
  the plurality of first electrode conducting lines;
  the plurality of first contacts electrically connected to the plurality of first electrode conducting lines; and
  a plurality of bridge lines;
a second conductive layer disposed on the first conductive layer, and the second conductive layer comprising:
  the plurality of second electrode conducting lines; and
  the plurality of second contacts electrically connected to the plurality of second electrode conducting lines; and
a third conductive layer disposed on the second conductive layer, wherein the plurality of light emitting elements are disposed on the third conductive layer, and the third conductive layer comprises the plurality of first sensing electrodes and the plurality of second sensing electrodes,
wherein the conductive layer is the first conductive layer, the second conductive layer or the third conductive layer,
wherein, in the first direction, one of the plurality of second sensing electrodes is disposed between a third sensing electrode and a fourth sensing electrode of the plurality of first sensing electrodes, the third sensing electrode is electrically connected to the fourth sensing electrode through one of the plurality of bridge lines, and a projection of the one of the bridge lines overlaps a projection of the one of the second sensing electrodes.

13. A display device, comprising:
a display panel; and
a backlight module disposed on a side of the display panel, and the backlight module comprising:
  a substrate;
  a plurality of light emitting elements disposed on the substrate;
  a touch sensing structure disposed on the substrate, wherein the touch sensing structure is disposed on a side of the plurality of light emitting elements away from a light emitting surface of the plurality of light emitting elements; and
  a conductive layer disposed between the plurality of light emitting elements and the substrate, wherein the conductive layer comprises at least a portion of the touch sensing structure, a plurality of first contacts or a plurality of second contacts, and the plurality of light emitting elements are electrically connected to the plurality of first contacts and the plurality of second contacts.

14. The display device of claim 13, further comprising a plurality of first electrode conducting lines and a plurality of second electrode conducting lines, wherein the plurality of first electrode conducting lines are extended in a first direction, the plurality of second electrode conducting lines are extended in a second direction, a plurality of pixels are defined by the plurality of first electrode conducting lines and the plurality of second electrode conducting lines crossing each other, and one of the plurality of light emitting elements is electrically connected to one of the plurality of first electrode conducting lines and one of the plurality of second electrode conducting lines.

15. The display device of claim 14, wherein one of the plurality of light emitting elements is corresponded to one of the plurality of pixels.

16. The display device of claim 14, wherein the touch sensing structure comprises a plurality of sensing electrodes electrically connected to each other, and one of the plurality of sensing electrodes is corresponded to one of the plurality of pixels.

17. The display device of claim 16, further comprising:
a first conductive layer disposed on the substrate, and the first conductive layer comprising:
  the plurality of first electrode conducting lines;
  the plurality of first contacts electrically connected to the plurality of first electrode conducting lines;
  the plurality of sensing electrodes; and
  a plurality of first bridge lines extending in the first direction, wherein two adjacent ones of the plurality of sensing electrodes in the first direction are electrically connected to each other through one of the plurality of first bridge lines; and
a second conductive layer disposed on the first conductive layer, wherein the plurality of light emitting elements are disposed on the second conductive layer, and the second conductive layer comprises:
  the plurality of second electrode conducting lines;
  the plurality of second contacts electrically connected to the plurality of second electrode conducting lines; and
  a plurality of second bridge lines extending in the second direction, wherein two adjacent ones of the plurality of sensing electrodes in the second direction are electrically connected to each other through one of the plurality of second bridge lines,
wherein the conductive layer is the first conductive layer or the second conductive layer.

18. The display device of claim 16, further comprising:
a first conductive layer disposed on the substrate, and the first conductive layer comprising:
  the plurality of first electrode conducting lines;
  the plurality of first contacts electrically connected to the plurality of first electrode conducting lines; and
  a plurality of first bridge lines extending in the first direction, wherein two adjacent ones of the plurality of sensing electrodes in the first direction are electrically connected to each other through one of the plurality of first bridge lines; and
a second conductive layer disposed on the first conductive layer, wherein the plurality of light emitting elements are disposed on the second conductive layer, and the second conductive layer comprises:
  the plurality of second electrode conducting lines;
  the plurality of second contacts electrically connected to the plurality of second electrode conducting lines;

the plurality of sensing electrodes; and
a plurality of second bridge lines extending in the second direction, wherein two adjacent ones of the plurality of sensing electrodes in the second direction are electrically connected to each other through one of the plurality of second bridge lines, wherein the conductive layer is the first conductive layer or the second conductive layer.

19. The display device of claim 14, wherein the touch sensing structure comprises:
a plurality of first sensing electrode strings extending in the first direction, wherein at least one of the plurality of first sensing electrode strings comprises a plurality of first sensing electrodes electrically connected to each other, and one of the plurality of first sensing electrodes is corresponded to a first pixel of the plurality of pixels; and
a plurality of second sensing electrode strings extending in the second direction and electrically isolated from the plurality of first sensing electrode strings, wherein at least one of the plurality of second sensing electrode strings comprises a plurality of second sensing electrodes electrically connected to each other, and one of the plurality of second sensing electrodes is corresponded to a second pixel of the plurality of pixels.

20. The display device of claim 19, further comprising:
a first conductive layer disposed on the substrate, and the first conductive layer comprising:
the plurality of first electrode conducting lines;
the plurality of first contacts electrically connected to the plurality of first electrode conducting lines;
the plurality of first sensing electrodes; and
a plurality of first bridge lines extending in the first direction, wherein two adjacent ones of the plurality of first sensing electrodes in the first direction are electrically connected to each other through a third bridge line of the plurality of first bridge lines, and two adjacent ones of the plurality of second sensing electrodes in the first direction are electrically connected to each other through a fourth bridge line of the plurality of first bridge lines; and
a second conductive layer disposed on the first conductive layer, wherein the plurality of light emitting elements are disposed on the second conductive layer, and the second conductive layer comprises:
the plurality of second electrode conducting lines;
the plurality of second contacts electrically connected to the plurality of second electrode conducting lines;
the plurality of second sensing electrodes; and
a plurality of second bridge lines extending in the second direction, wherein two adjacent ones of the plurality of first sensing electrodes in the second direction are electrically connected to each other through a fifth bridge line of the plurality of second bridge lines, and two adjacent ones of the plurality of second sensing electrodes in the second direction are electrically connected to each other through a sixth bridge line of the plurality of second bridge lines, wherein the conductive layer is the first conductive layer or the second conductive layer.

21. The display device of claim 20, wherein the first conductive layer further comprises a plurality of seventh bridge lines, one of the plurality of second sensing electrodes is disposed between a third sensing electrode and a fourth sensing electrode of the plurality of first sensing electrodes in the first direction, the third sensing electrode is electrically connected to the fourth sensing electrode through one of the plurality of seventh bridge lines, and a projection of the one of the plurality of seventh bridge lines overlaps a projection of the one of the plurality of second sensing electrodes.

* * * * *